(12) United States Patent
Koramutla et al.

(10) Patent No.: US 12,483,512 B2
(45) Date of Patent: Nov. 25, 2025

(54) HARDWARE BASED ETHERNET AUDIO AND VIDEO BRIDGING (EAVB) PACKET SCHEDULING

(71) Applicant: QUALCOMM Incorporated, San Diego, CA (US)

(72) Inventors: Narasimha Rao Koramutla, San Diego, CA (US); Arun Gothekar, Hyderabad (IN); Susheel Kumar Yadav Yadagiri, San Diego, CA (US); Akshat Gupta, New Delhi (IN); Srinivas Marakala, San Diego, CA (US); Naveen Kumar Narala, Bengaluru (IN); Radvajesh Munibyraiah, Bangalore (IN)

(73) Assignee: Qualcomm Incorporated, San Diego, CA (US)

( * ) Notice: Subject to any disclaimer, the term of this patent is extended or adjusted under 35 U.S.C. 154(b) by 548 days.

(21) Appl. No.: 17/937,495

(22) Filed: Oct. 3, 2022

(65) Prior Publication Data

US 2024/0113986 A1 Apr. 4, 2024

(51) Int. Cl.
*H04L 47/62* (2022.01)
*H04L 47/2416* (2022.01)
(Continued)

(52) U.S. Cl.
CPC ........ *H04L 47/624* (2013.01); *H04L 47/2416* (2013.01); *H04L 47/28* (2013.01); *H04L 65/65* (2022.05); *H04L 69/22* (2013.01)

(58) Field of Classification Search
None
See application file for complete search history.

(56) References Cited

U.S. PATENT DOCUMENTS 9,684,615 B1 * 6/2017 Nguyen .................. G06F 13/30
2016/0182176 A1 6/2016 Ramachandra
(Continued)

OTHER PUBLICATIONS

"IEEE Standard for Layer 2 Transport Protocol for Time-Sensitive Applications in Bridged Local Area Network", IEEE Std 1722-2011, IEEE Standard, IEEE, Piscataway, NJ, USA, May 6, 2011, 56 Pages, XP017694503, The Whole Document.
(Continued)

*Primary Examiner* — Jenkey Van
(74) *Attorney, Agent, or Firm* — Muncy, Geissler, Olds & Lowe, P.C.

(57) ABSTRACT

Various embodiments include an automobile network device that includes a descriptor sorting engine (DSE). The DSE may include a direct memory access (DMA) controller, a memory organized by channel clusters that each include a plurality of first-in first-out (FIFO) memories, a timer, and a time stamp (TS) sorting logic component. The DMA controller may be configured to pull timestamp-pointer pairs from packet descriptors stored in an unsorted descriptor ring memory, store the timestamp-pointer pairs in the FIFO memories, trigger the TS sorting logic component to reorder the timestamp-pointer pairs in the FIFO memories so that they are sorted in ascending order, use the sorted timestamp-pointer pairs in the FIFO memories to read the packet descriptors stored in an unsorted descriptor ring memory, and store the packet descriptors in a sorted descriptor ring memory.

22 Claims, 19 Drawing Sheets

(51) Int. Cl.
*H04L 47/28* (2022.01)
*H04L 65/65* (2022.01)
*H04L 69/22* (2022.01)

(56) References Cited

U.S. PATENT DOCUMENTS

| | | |
|---|---|---|
| 2016/0191973 A1 | 6/2016 | Joy et al. |
| 2017/0264719 A1 | 9/2017 | Koramutla et al. |
| 2017/0315939 A1 | 11/2017 | McBride et al. |
| 2018/0081854 A1 | 3/2018 | Joy |
| 2021/0409388 A1* | 12/2021 | Batcher ............... H04L 49/3018 |
| 2023/0050776 A1* | 2/2023 | Livne .................. H04L 49/9047 |

OTHER PUBLICATIONS

International Search Report and Written Opinion—PCT/US2023/029112—ISA/EPO—Oct. 20, 2023. 14 pages.
Karthik S., "Investigation of Time-Synchronization Over Ethernet In-vehicle Networks for Automotive Applications", Oct. 26, 2015, 86 Pages, XP055500814, The Whole Document.

* cited by examiner

HARDWARE BASED ETHERNET AUDIO AND VIDEO BRIDGING (EAVB) PACKET SCHEDULING

BACKGROUND

Over the past several years, the modern automobile has transformed from a self-propelled mechanical vehicle into a powerful and complex electro-mechanical system that includes a large number of electronic components, including multiple electronic displays, microphones, speakers, sensors, control units, processors and systems-on-chips (SOCs) that implement or control many of the vehicle's functions, features, and operations.

Currently, automobile manufacturers use multiple different types of cables and connections (e.g., coaxial cables, shielded cables, simple audio wires, high-definition multimedia interface cables, Ethernet cables, etc.) to connect their electronic components to one another. In recent years, automobile manufacturers have begun including Ethernet switches in their vehicles and are now moving towards replacing all the different cables and connection types with Ethernet.

SUMMARY

Various aspects include hardware-based Ethernet audio and video bridging (EAVB) packet/descriptor sorting components that configured to streamline and transfer packets as per the generalized precision time protocol (gPTP) time embedded in the eAVB packets. Various aspects may include an automobile network device that includes a descriptor sorting engine (DSE). The DSE engine may include a memory organized by channel clusters that each include first-in first-out (FIFO) memories, a time stamp (TS) sorting logic component, and a direct memory access (DMA) controller coupled to the memory, the TS sorting logic component. The DMA controller may be configured to pull timestamp-pointer pairs from packet descriptors stored in an unsorted descriptor ring memory, trigger the TS sorting logic component to reorder the timestamp-pointer pairs in the FIFO memories so that the timestamp-pointer pairs are sorted in ascending order, and store the packet descriptors in a sorted descriptor ring memory.

Some aspects may further include an Ethernet media access controller (EMAC) coupled to the DMA controller, in which the DMA controller may be further configured to store the timestamp-pointer pairs in the FIFO memories, use the sorted timestamp-pointer pairs in the FIFO memories to read the packet descriptors stored in an unsorted descriptor ring memory, and trigger the EMAC to stream data from the sorted descriptor ring memory. Some aspects may further include a processor configured to invoke the DSE to sort data packets in response to determining that there is no opportunity to modify the EMAC Internet protocol (EMAC IP).

In some aspects, the EMAC includes a dedicated descriptor ring scanner (DRS) hardware, and the network device further comprises a processor configured to invoke the DRS hardware in response to determining that there is an opportunity to modify the EMAC Internet protocol (EMAC IP). In some aspects, invoking the DRS hardware may causes the DRS hardware to fetch a descriptor header pointed by a descriptor ring buffer read index, compare a timestamp embedded in the descriptor header with a current time to determine whether the timestamp has elapsed, trigger a DMA controller of a current descriptor to transfer packets on a network in response to determining that the timestamp is elapsed, and increment the descriptor ring buffer read index.

In some aspects, the data stored in the sorted descriptor ring memory may be audio data. In some aspects, the data stored in the sorted descriptor ring memory may include video data. In some aspects, the data stored in the sorted descriptor ring memory is time sensitive networking data.

Further aspects may include methods performed by one or more processors of an automobile network device, including: pulling timestamp-pointer pairs from packet descriptors stored in an unsorted descriptor ring memory; storing the timestamp-pointer pairs in the FIFO memories; triggering the TS sorting logic component to reorder the timestamp-pointer pairs in the FIFO memories so that the timestamp-pointer pairs are sorted in ascending order; using the sorted timestamp-pointer pairs in the FIFO memories to read the packet descriptors stored in an unsorted descriptor ring memory; and storing the packet descriptors in a sorted descriptor ring memory.

Some aspects may further include triggering an Ethernet media access controller (EMAC) to stream data from the sorted descriptor ring memory. Some aspects may further include invoking sorting of data packets in response to determining that there is no opportunity to modify the EMAC Internet protocol (EMAC IP).

Some aspects may further include invoking a dedicated descriptor ring scanner (DRS) hardware in response to determining that there is an opportunity to modify the EMAC Internet protocol (EMAC IP). Some aspects may further include the DRS hardware includes: fetching a descriptor header pointed by a descriptor ring buffer read index; comparing a timestamp embedded in the descriptor header with a current time to determine whether the timestamp has elapsed; triggering a direct memory access (DMA) controller of a current descriptor to transfer packets on a network in response to determining that the timestamp is elapsed; and incrementing the descriptor ring buffer read index.

In some aspects, the data stored in the sorted descriptor ring memory may be audio data. In some aspects, the data stored in the sorted descriptor ring memory may include video data. In some aspects, the data stored in the sorted descriptor ring memory may be time sensitive networking data.

Further aspects may include an automobile network device having means for performing functions of any of the methods summarized above.

BRIEF DESCRIPTION OF THE DRAWINGS

The accompanying drawings, which are incorporated herein and constitute part of this specification, illustrate exemplary embodiments of the claims, and together with the general description given above and the detailed description given below, serve to explain the features of the claims.

DETAILED DESCRIPTION

Figure 1A:
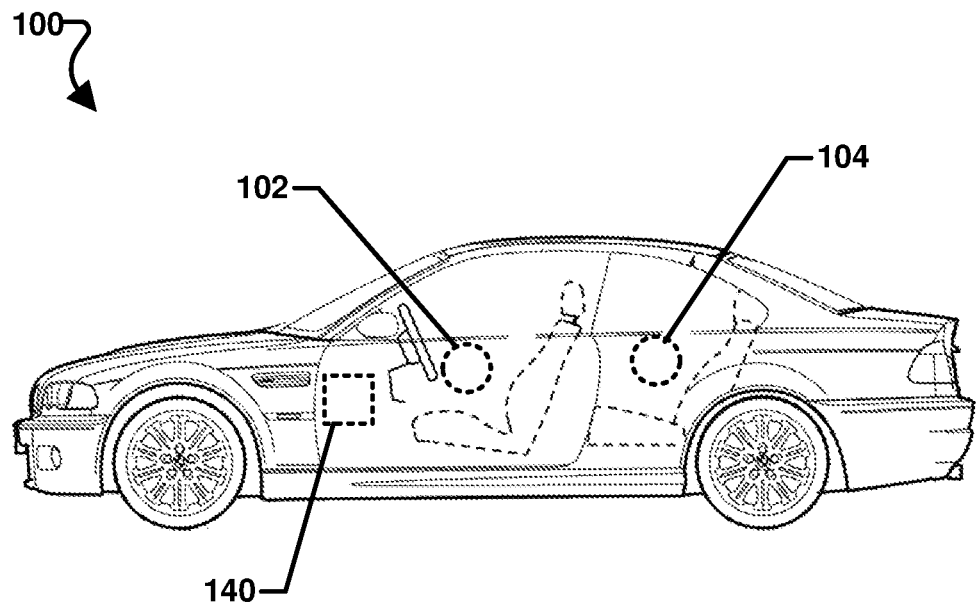
FIGS. 1A and 1B are component block diagrams illustrating a vehicle suitable for implementing various embodiments.

The various embodiments will be described in detail with reference to the accompanying drawings. Wherever possible, the same reference numbers will be used throughout the drawings to refer to the same or like parts. References made to particular examples and implementations are for illustrative purposes and are not intended to limit the scope of the claims.

In overview, various embodiments include a hardware-based Ethernet audio and video bridging (EAVB) packet/descriptor sorting components that are configured to streamline and transfer packets as per the generalized precision time protocol (gPTP) time embedded in the eAVB packets. In some embodiments, the components may include a dedicated descriptor sorting engine (DSE) that is located outside of the Ethernet media access controller (EMAC), and suitable for use when there is no opportunity to modify the EMAC Internet protocol (EMAC IP), such as when the EMAC IP is licensed from 3rd party, etc. Some embodiments may also include a dedicated descriptor ring scanner (DRS) hardware inside the EMAC that is suitable for use when there is an opportunity to modify the EMAC hardware IP return-to-zero (RZ). That is, the embodiments may use DRS for hardware based eAVB packet/descriptor sorting to streamline and transfer the packets as per the gPTP time embedded in the eAVB packets.

In some embodiments, the DSE may include a direct memory access (DMA) controller, a memory organized by channel clusters that each include a plurality of first-in first-out (FIFO) memories, a timer, and a time stamp (TS) sorting logic component. The DMA controller may be configured to pull timestamp-pointer pairs from packet descriptors stored in an unsorted descriptor ring memory, store the timestamp-pointer pairs in the FIFO memories, and trigger the TS sorting logic component to reorder the timestamp-pointer pairs in the FIFO memories so that they are sorted in ascending order. The DMA controller may use the sorted timestamp-pointer pairs in the FIFO memories to read the full packet descriptors stored in an unsorted descriptor ring memory, store the full packet descriptors in a sorted descriptor ring memory in sorted order, and trigger the EMAC to send data from the sorted descriptor ring memory.

Various embodiments overcome many of the limitations of conventional solutions for communicating data using Ethernet audio and video bridging (EAVB) systems to improve audio-video playback. For example, the various embodiments may reduce or eliminate gaps, lags, delays, etc. audio-video playback. In addition, the various embodiments may reduce latency, processing workloads, and power consumption on computing devices and system on chips (SOCs). Accordingly, various embodiments may be implemented in current and future automotive applications, which may include SOCs that include or implement a vehicle's in-vehicle infotainment (IVI) system, advanced driver assistance system (ADAS), and/or modem telematics system. For all these reasons, the various embodiments may improve the safety and reliability of vehicles. Additional enhancements, improvements, and benefits will be evident from the disclosures below.

The terms "component," "module," "system," and the like may be used herein to refer to a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a computing device and the computing device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

The term "system on chip" (SOC) is used herein to refer to a single integrated circuit (IC) chip that contains multiple resources and/or processors integrated on a single substrate. A single SOC may contain circuitry for digital, analog, mixed-signal, and radio-frequency functions. A single SOC may also include any number of general purpose and/or specialized processors (digital signal processors, modem processors, video processors, etc.), memory blocks (e.g., ROM, RAM, Flash, etc.), and resources (e.g., timers, voltage regulators, oscillators, etc.). SOCs may also include software for controlling the integrated resources and processors, as well as for controlling peripheral devices.

The term "system in a package" (SIP) may be used herein to refer to a single module or package that contains multiple resources, computational units, cores and/or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP may also include multiple independent SOCs coupled together via high speed communication circuitry and packaged in close proximity, such as on a single motherboard or in a single wireless device. The proximity of the SOCs facilitates high speed communications and the sharing of memory and resources.

The term "multicore processor" may be used herein to refer to a single integrated circuit (IC) chip or chip package that contains two or more independent processing cores (e.g., a central processing unit (CPU) core, Internet protocol (IP) core, graphics processor unit (GPU) core, etc.) configured to read and execute program instructions. A SOC may include multiple multicore processors, and each processor in an SOC may be referred to as a core.

Conventional automobile manufacturers use a multitude of different types of cables and connections (e.g., coaxial cables, shielded cables, simple audio wires, High-Definition Multimedia Interface (HDMI) cables, MOTS cables, Ethernet cables, etc.) to connect their electronic components to one another. In recent years, automobile manufacturers have begun including Ethernet switches in their vehicles and are now moving towards replacing all the different cables and connection types with Ethernet. As such, all the components in the vehicle (e.g., speakers, microphones, displays, etc.) could soon be connected to one another via the same Ethernet network. While there are many benefits to this configuration, there are also a few technical challenges related to the timing, synchronization, latency, performance and/are power consumption, particularly for the audio visual (AV) components.

AV data communications generally have low latency tolerances and/or high delivery/accuracy guarantee requirements. For example, because users are highly perceptive to short delays or gaps (even in milliseconds) in an audio or video stream. Users are also highly perceptive to any discrepancies between two or more corresponding signals (e.g., between audio signals sent to different speakers in the vehicle, between an audio signal output from a speaker and its corresponding video rendered on the display, etc.). As such, it is important for the vehicle's computing systems and/or ethernet network to accurately synchronize different streams from different components and reduce or minimize packet loss (dropped packets, etc.).

It is also important for the vehicle to support and comply with various standards, such as IEEE 1722 for audio-video transport protocol (AVTP), IEEE 802.1AS for generalized precision time protocol (gPTP), IEEE 802.1Qav for forwarding and queuing for time-sensitive streams (FQTSS), and IEEE802.1Qat for stream reservation protocol (SRP). Compliance with such standards may ensure compatibility between multiple vendor EAVB devices in automotive systems across its various systems and subsystems, such as the in-vehicle infotainment (IVI) system, advanced driver assistance system (ADAS), and modem telematics system.

The audio-video transport protocol (AVTP) defines multiple formats for audio and video, including AVTP Audio Format (AAF), MPEG2-TS, H.264 and Motion JPEG (MJPEG). The MPEG2-TS format may be used to transport a combined audio and video stream. Since there are often multiple independent audio and video components in the vehicle (e.g., speaker is separate from the display, microphone is separate from the camera, etc.), the audio and video may also be transported in separate streams. The audio stream may be transported as a pulse-code modulation (PCM) data (not a compression data) using the AAF format. The video stream may use the H.264 or MJPEG formats.

As mentioned above, the audio and video components may be separate and/or independent of one another, and the audio may be transported in a separate stream than the video. In addition, modern vehicles may have 5.1 or 12.1 speakers, multiple microphones (e.g., one for the driver seat, one for the passenger seat, etc.), multiple displays, etc. Each component may operate its own local audio-video card, and there may be jitters between their respective clocks.

For all these reasons, synchronization is an important aspect of sending audio and video as separate streams (e.g., using the AAF, H.264, or MJPEG formats). The above protocols support synchronization of all the audio and video codecs inside the vehicle, which may be aligned or synchronized via time stamping.

gPTP supports time synchronization of all the components in the vehicle that are connected via Ethernet. For example, every speaker, microphone and display may operate with the same wall clock time, periodically synchronize their clocks to match their times across the system (typically the entire network). One node is designated as a gPTP Master, and all the nodes behave as slaves and try to synchronize with the gPTP master.

FQTSS supports a forward keying technique that allow for the transfer of packets. SRP ensures that there is a guaranteed bandwidth reserved for the audio video streams in the network. For example, when there are multiple switches and bridges and an end node (e.g., SOC, etc.) is sending a data, SRP may inform the switches and bridges that a particular stream requires a particular bandwidth guarantee.

Figure 1B:
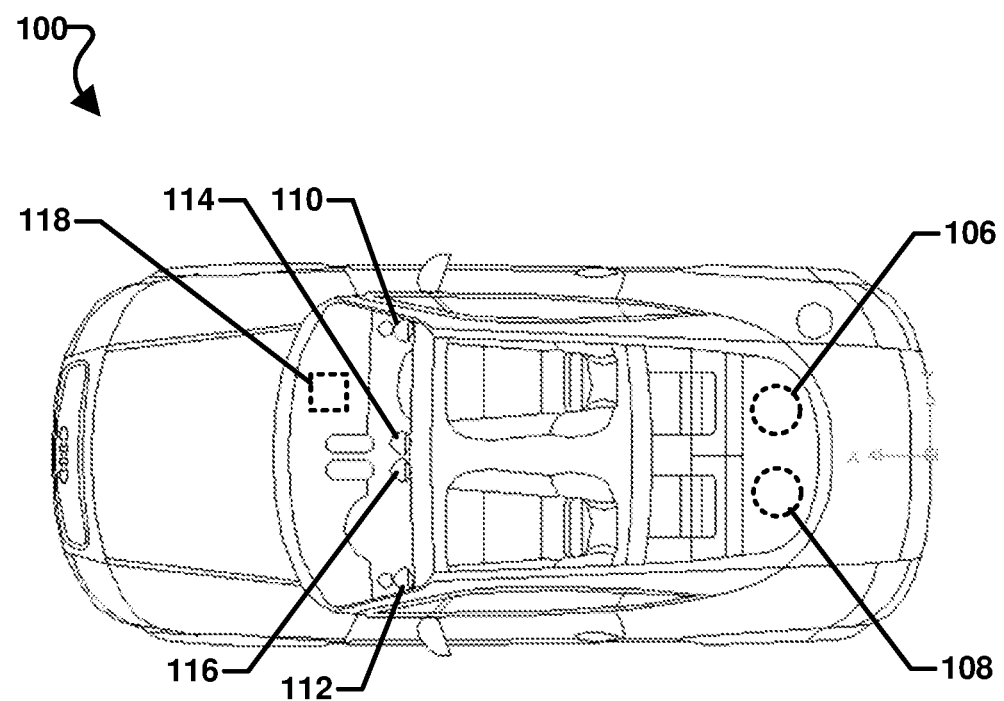

Various embodiments may be implemented within a variety of host vehicles, an example vehicle 100 of which is illustrated in FIGS. 1A and 1B. With reference to FIGS. 1A and 1B, the vehicle 100 may include a plurality of sensors 102-116 disposed in or on the vehicle that are used for various purposes. Each of the sensors 102-116 may be in wired or wireless communication with a control unit 140, as well as with each other. The control unit 140 may be coupled to any of all of the sensors 102-116 and to other components and sub-systems within the vehicle 100 via an ethernet switch 118.

The sensors 102-116 may include speakers 102-108, microphones 110, 112, and cameras 114, 116 or other optical sensors or photo optic sensors. The sensors 102-116, disposed in or on the vehicle, may be used for various purposes, such as driver assistance, navigation, control, crash avoidance, position determination, etc., as well to provide sensor data regarding objects and people in or on the vehicle 100. In some embodiments, the vehicle may include one or more of a wide variety of sensors capable of detecting a variety of information useful for navigation, collision avoidance, and general vehicle operation. Examples of such sensors include impact sensors, ranging sensors, IR sensors, ultrasonic sensors, proximity sensors, occupancy sensors, tire pressure sensors, humidity sensors, temperature sensors, control input sensors, satellite geo-positioning system receivers, accelerometers, vibration sensors, gyroscopes, gravimeters, force meters, stress meters, strain sensors, and fuel gauge sensors.

Figure 1C:
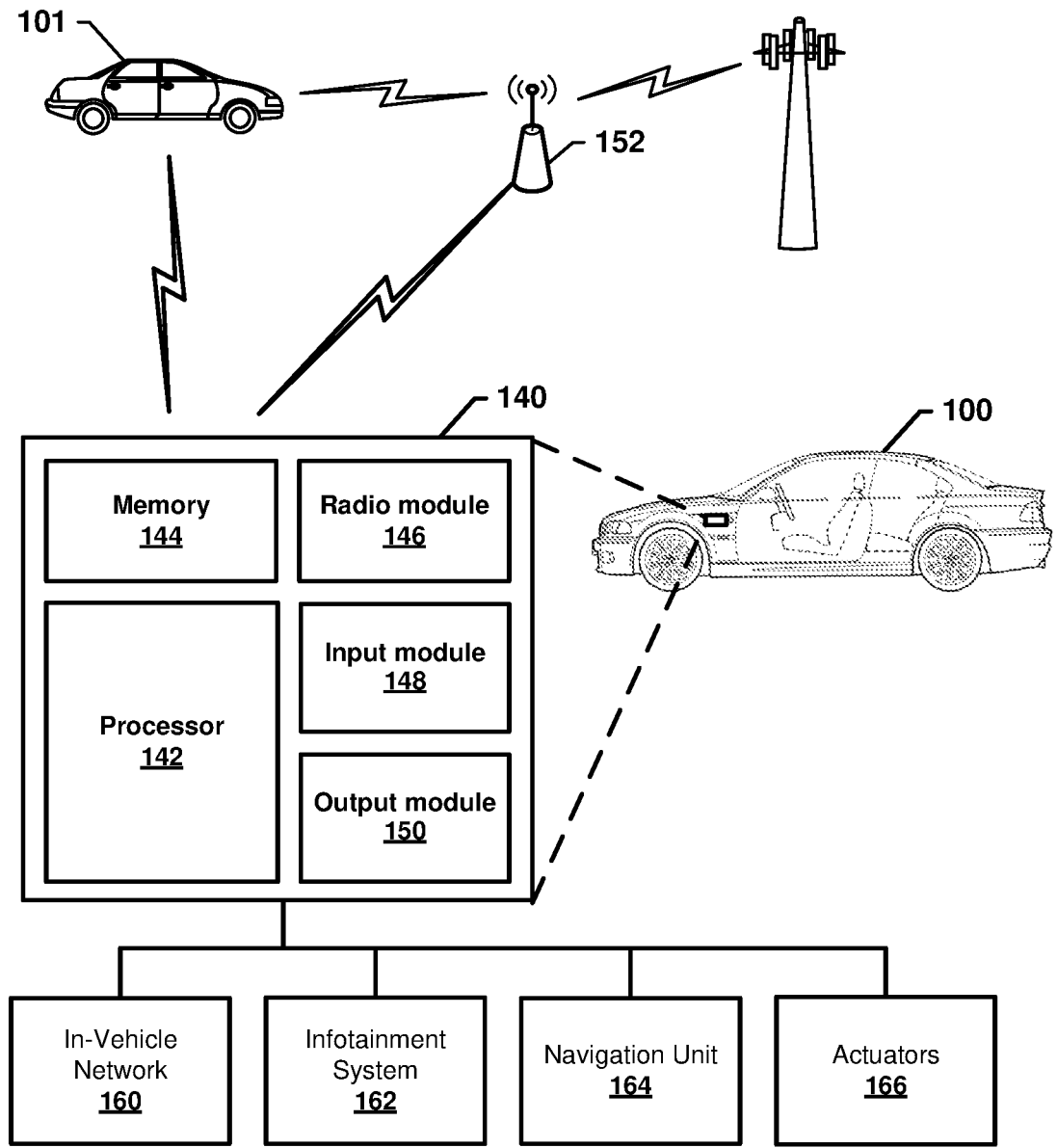
FIG. 1C is a component diagram of an example vehicle system suitable for implementing various embodiments.

FIG. 1C is a component block diagram illustrating a system of components and support systems suitable for implementing various embodiments. With reference to FIGS. 1A, 1B, and 1C, the vehicle 100 may include onboard equipment, such as a control unit 140 that includes a processor 142, a memory 144, a radio module 146, an input module 148 and an output module 150. The control unit 140 may include, control, access, and/or communicate with various other systems and sub-systems in the vehicle 100, such as the in-vehicle network 160, infotainment system 162, navigation unit 164, and actuators 166.

While the control unit 140 is described as including separate components, in some embodiments some or all of the components (e.g., the processor 142, memory 144, radio module 146, etc.) may be integrated in a single device or module, such as a system-on-chip (SOC) processing device. Such an SOC processing device may be configured for use in vehicles and be configured, such as with processor-executable instructions executing in the processor 142, to perform operations of various embodiments when installed into a host vehicle.

The processor 142 may be configured with processor-executable instructions to perform various embodiments using data and information received from various components and sensors of the vehicle 100, such as the speakers 102-108, microphones 110, 112, cameras 114, 116, and/or in-vehicle entertainment system, etc. In addition, the processor 142 may be configured to control maneuvering, navigation, and other operations of the host vehicle 100. For example, in some embodiments, the processor 142 may be configured to implement safety and driver assistance functions of the vehicle.

The radio module 146 may be configured for wireless communication. The radio module 146 may exchange signals (e.g., command signals for controlling maneuvering, signals from navigation facilities, etc.) with a network transceiver 152, and may provide the signals to the processor 142 and/or a navigation unit 164. In some embodiments, the radio module 146 may enable the vehicle 100 to communicate with another vehicle 101 or wireless communication device through a bidirectional or unidirectional communication link.

The input module 148 may receive sensor data from one or more vehicle sensors 102-116 as well as electronic signals from other components, including the drive control components and the navigation components. The output module 150 may be used to communicate with or activate various components of the host vehicle 100, including the drive control components, the navigation components, and the sensor(s) 102-116. In addition, the output module 150 may be configured to control sensors and in-vehicle displays.

In some embodiments, the control unit 140 may be coupled to the drive control components to control physical elements of the host vehicle 100 related to maneuvering and navigation of the host vehicle, such as the engine, motors, throttles, steering elements, braking or deceleration elements, and the like. The drive control components may also include components that control other devices of the host vehicle, including speakers, interior and/or exterior informational displays (which may include a display screen or other devices to display information), environmental controls (e.g., air conditioning and heating), external and/or interior lighting, and other similar components or subsystems.

The control unit 140 may receive and use data from the navigation components to determine the present position and orientation of the host vehicle 100, as well as an appropriate course toward a destination. Through control of the drive control elements, the processor 142 may control the host vehicle 100 to navigate and maneuver. The processor 142 and/or the navigation components may be configured to communicate with a server on a network (e.g., the Internet) using a wireless connection with a cellular data network to receive commands to control maneuvering, receive data useful in navigation, provide real-time position reports, and assess other data.

Examples of an in-vehicle network 160 include a Controller Area Network (CAN), a Local Interconnect Network (LIN), a network using the FlexRay protocol, a Media Oriented Systems Transport (MOST) network, and an Automotive Ethernet network. Examples of vehicle actuators 166 include various physical control systems such as for steering, brakes, engine operation, lights, directional signals, and the like.

Figure 2:
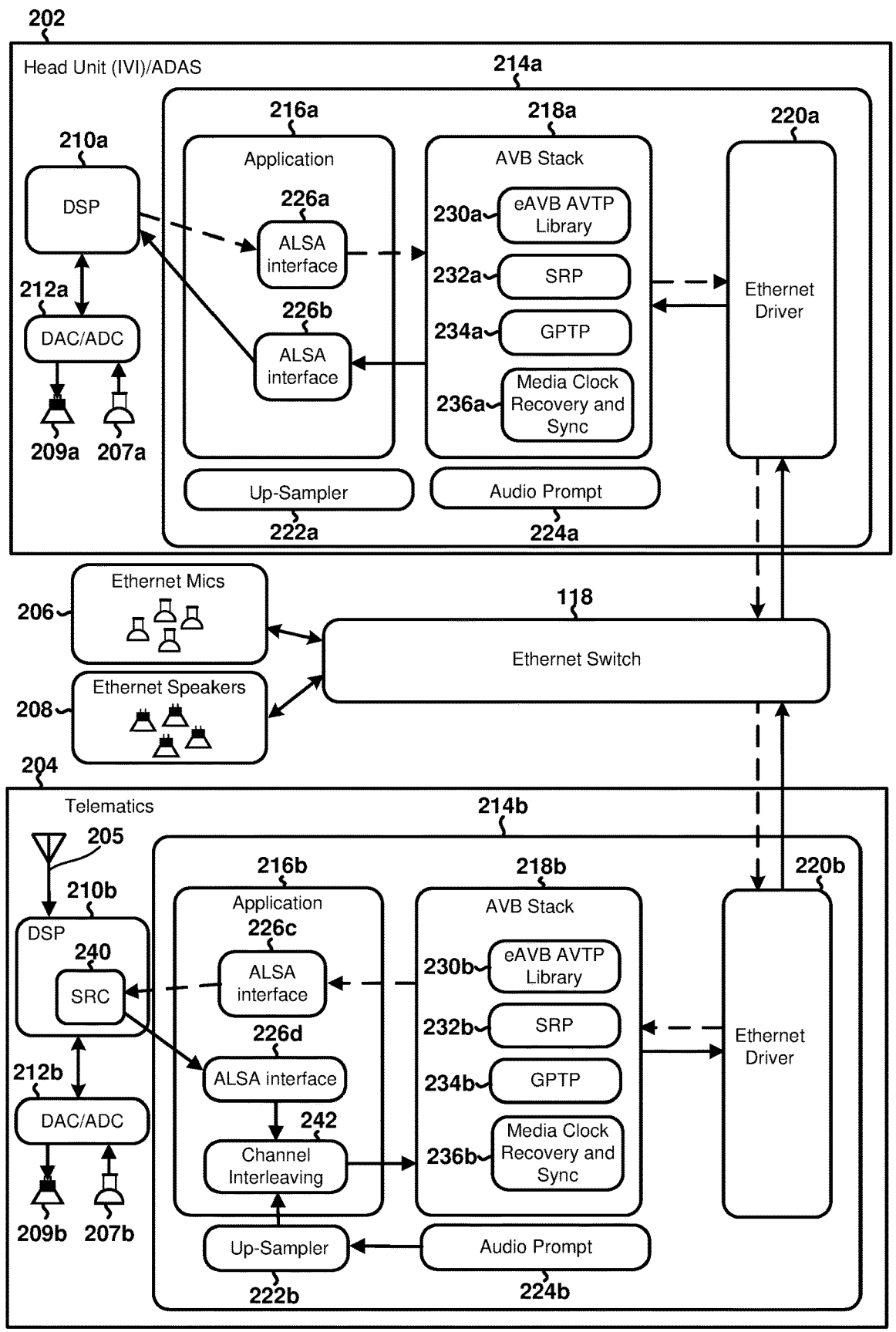
FIG. 2 is a component block diagram illustrating various data flows through components that could be included in a vehicle and/or which are suitable for implementing various embodiments.

FIG. 2 is a component block diagram illustrating various data flows through components that could be included in a vehicle and/or which are suitable for implementing various embodiments. With reference to FIGS. 1A-2, a vehicle may include a head unit 202, a modem telematics system 204, a plurality of Ethernet microphones 206, and a plurality of Ethernet speakers 208, any or all of which may be coupled to one another via an Ethernet switch 118. The head unit 202 may be, may include, may be included in, and/or may implement an in-vehicle infotainment (IVI) system and/or an advanced driver assistance system (ADAS).

The head unit 202 and modem telematics system 204 may each include similar components as illustrated. For example, the head unit 202 may include a microphone 207a, a speaker 209a, a digital signal processor (DSP) 210a, a digital-to-analog converter (DAC) and analog-to-digital converter (ADC) 212a, and an SOC 214a that includes an application component 216a, an audio and video bridging (AVB) component 218a, an Ethernet driver 220a, an up-sampler 222a, and an audio prompt 224a. Similarly, the modem telematics system 204 may include a microphone 207b, a speaker 209b, a DSP 210b, a DAC and ADC 212b, and an SOC 214b that includes an application component 216b, an AVB component 218b, an Ethernet driver 220b, an up-sampler 222b, and an audio prompt 224b. In some embodiments, the modem telematics system 204 and/or the SOC 214b may be a mobile station modem (MSM) that includes an integrated cellular modem (not illustrated separately in FIG. 2). In the example illustrated in FIG. 2, the modem telematics system 204 also includes an antenna 205, the DSP 210b includes a sample rate conversion (SRC) 240 component, and the application component 216b includes a channel interleaving component 242.

The application components 216a, 216b may include one or more an advanced Linux sound architecture (ALSA) interface components 226a, 226b, 226c, 226d. The AVB components 218a, 218b may include an Ethernet AVB (eAVB) audio-video transport protocol (AVTP) library 230a, 230b, a stream reservation protocol (SRP) component 232a, 232b, a generalized precision time protocol (gPTP) component 234a, 234b, and a media clock recovery and synchronization component 236a, 236b.

Figure 3:
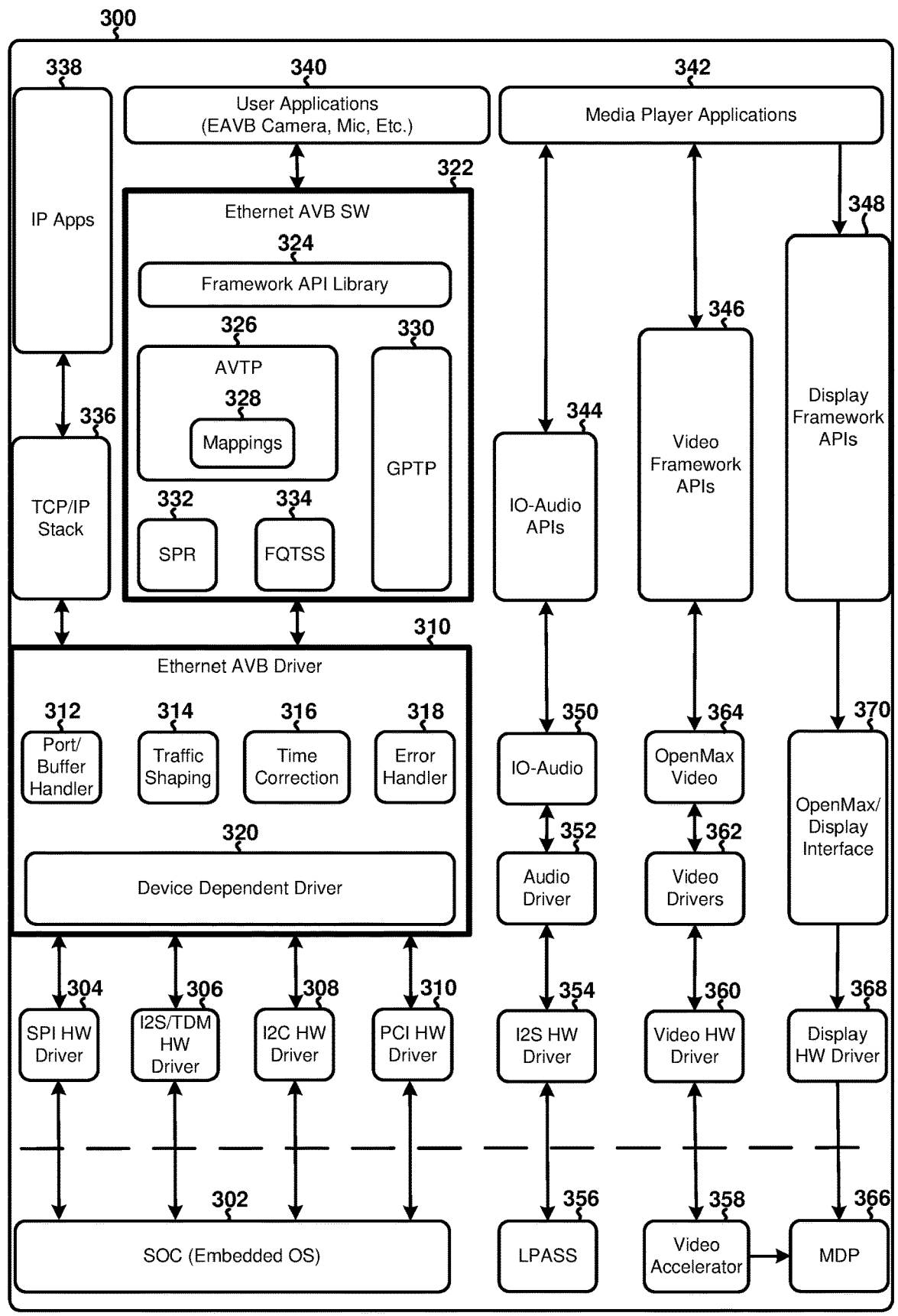
FIG. 3 is a component block diagram that illustrates components in a computing system that could be included in a vehicle and configured to manage different types of data streams in accordance with some embodiments.

FIG. 3 is a component block diagram illustrating components in a computing system 300 that could be included in a vehicle and configured to manage different types of data streams in accordance with some embodiments. With reference to FIGS. 1A-3, the computing system 300 may include an SOC 302 (with an embedded operating system), a Serial Peripheral Interface (SPI) hardware driver 304, a digital data streaming interface hardware driver 306 (e.g., an Integrated Inter-IC Sound Bus (I2S) or time division multiplexer (TDM)), an I2C hardware driver 308, a peripheral component interconnect (PCI) hardware driver 310, an Ethernet AVB driver 310, a port/buffer handler 312, a traffic shaping 314 component, a time correction 316 component, an error handler 318 component, a device dependent driver 320, an Ethernet AVB software 322 component, a framework application programming interface (API) library 324 component, an AVTP 326 component, a mappings 328 component, a gPTP 330 component, an SPR 332 component, a FQTSS 334 component, a TCP/IP stack 336 component, an IP Apps 338 component, a user applications (EAVB Camera, Mic, etc.) component 340, media player applications 342, IO-audio APIs 344, video framework APIs 346, display framework APIs 348, an IO-audio 350 component, an audio driver 352, an I2S hardware driver 354, a low-power audio subsystem (LPASS) 356, video accelerator hardware 358, a video hardware driver 360, video drivers 362, an OpenMax video component 364, a mobile development platform (MDP) component 366, a display hardware driver 368, and an OpenMax/display interface 370.

In some embodiments, the Ethernet AVB driver 310 and Ethernet AVB software components 322 may be modified or configured with processor executable instructions to support the hardware and/or implement various features of the embodiments. Although not illustrated separately, the computing system 300 may also include various centralized processing units (CPUs), digital signal processors (DSPs), network processing units (NPUs), neural network signal processors (NSPs), dedicated hardware accelerators, SoC infrastructure cores, etc. configured to implement the various embodiments.

AV data communications generally have low latency tolerances and/or high delivery/accuracy guarantee requirements. To meet these requirements, IEEE protocols define various classes of automotive packets. The most time-sensitive applications use Class A streaming, which includes sending eight thousand (8000) packets per second with a transfer interval of 125 microseconds (usec). Lower priority streaming tasks may use Class-B streaming, which includes sending four thousand (4000) packets per second with a transfer interval of 250 usec.

Figure 4A:
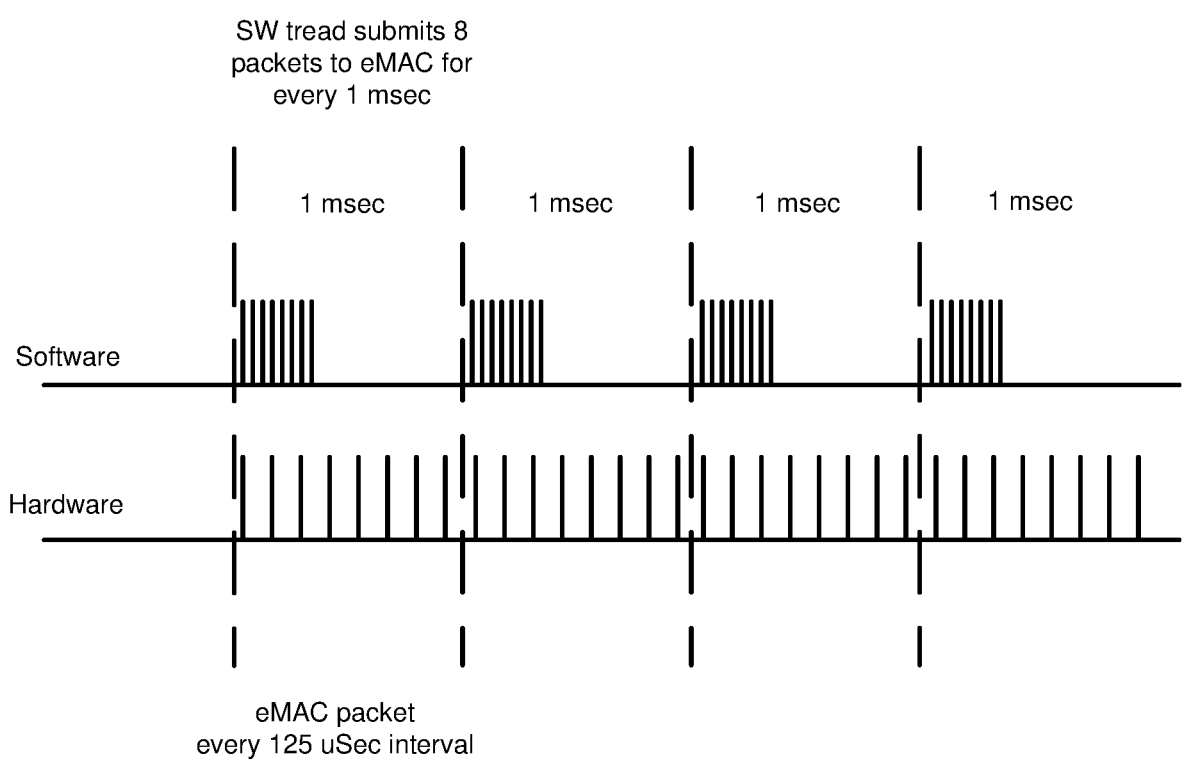
FIGS. 4A-4C are timing diagrams that illustrate examples of packet streaming in accordance with some embodiments.
Figure 4B:
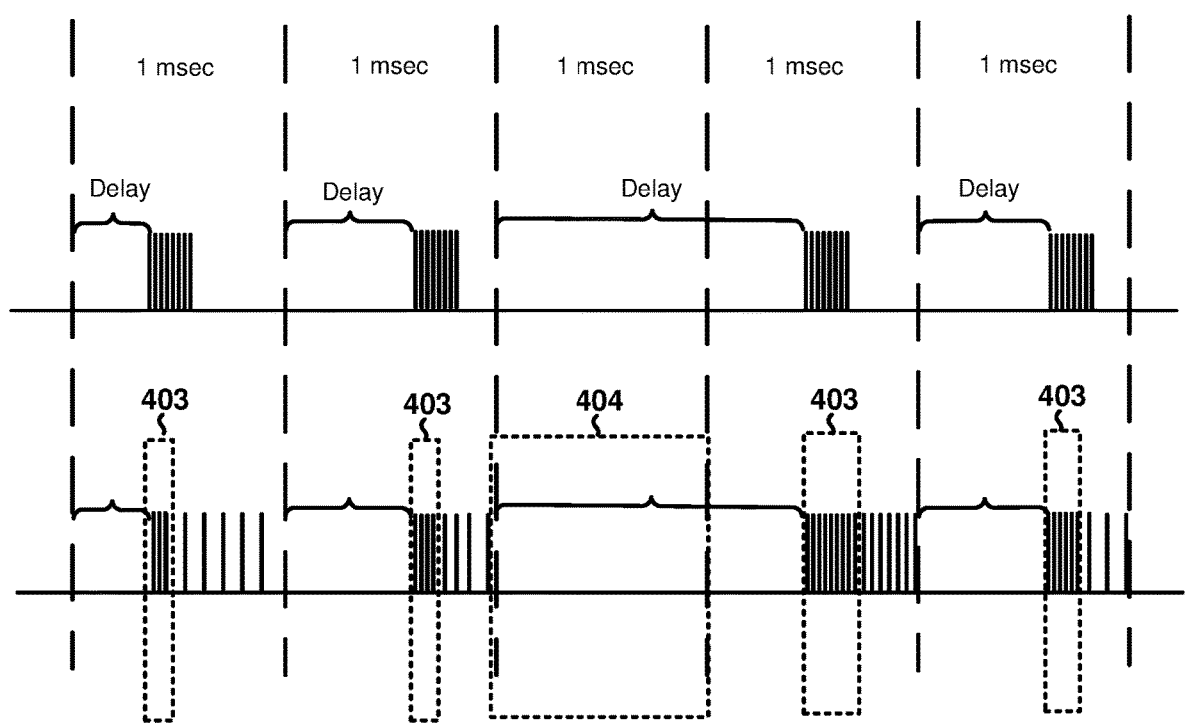
Figure 4C:
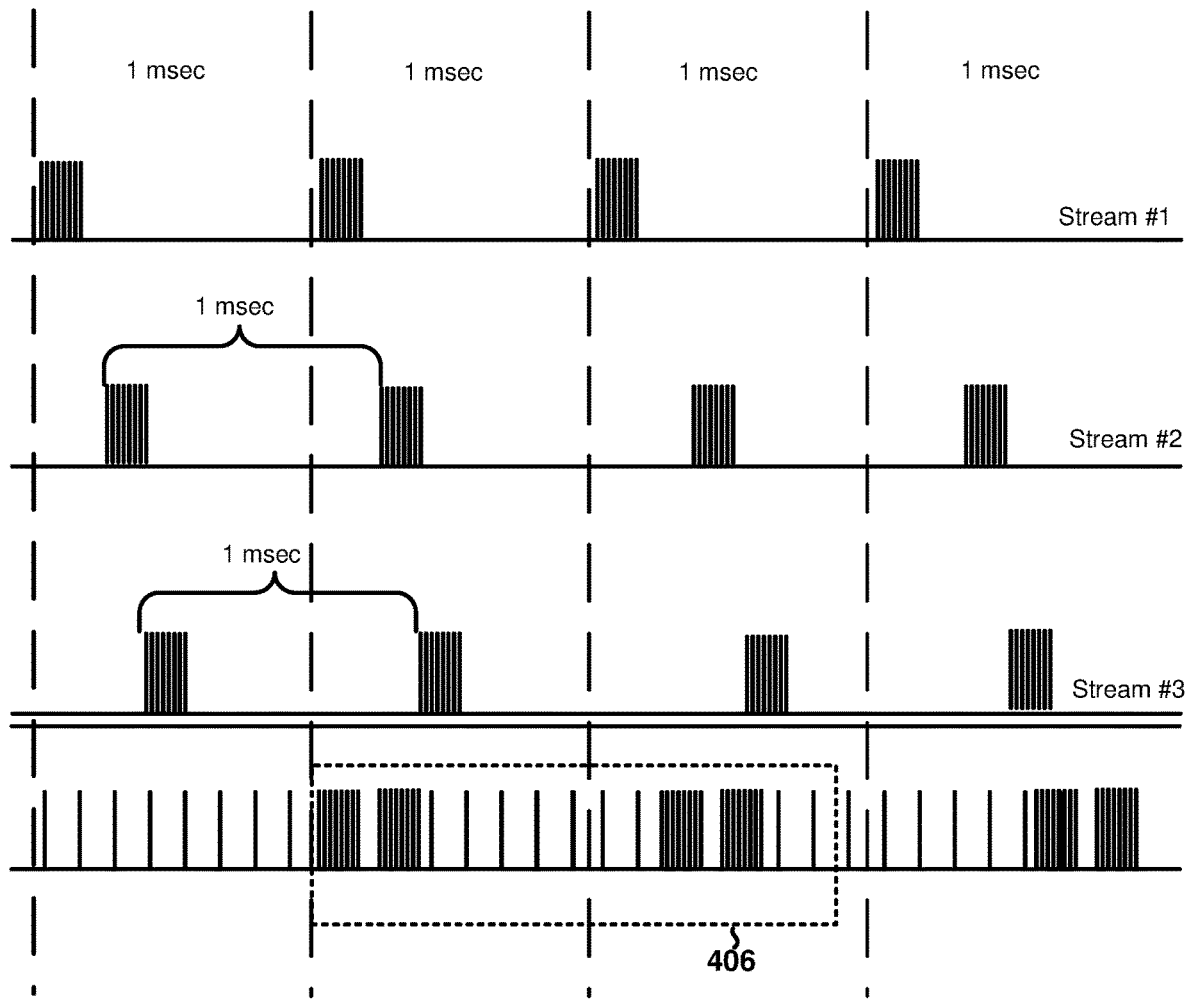
Figure 5A:
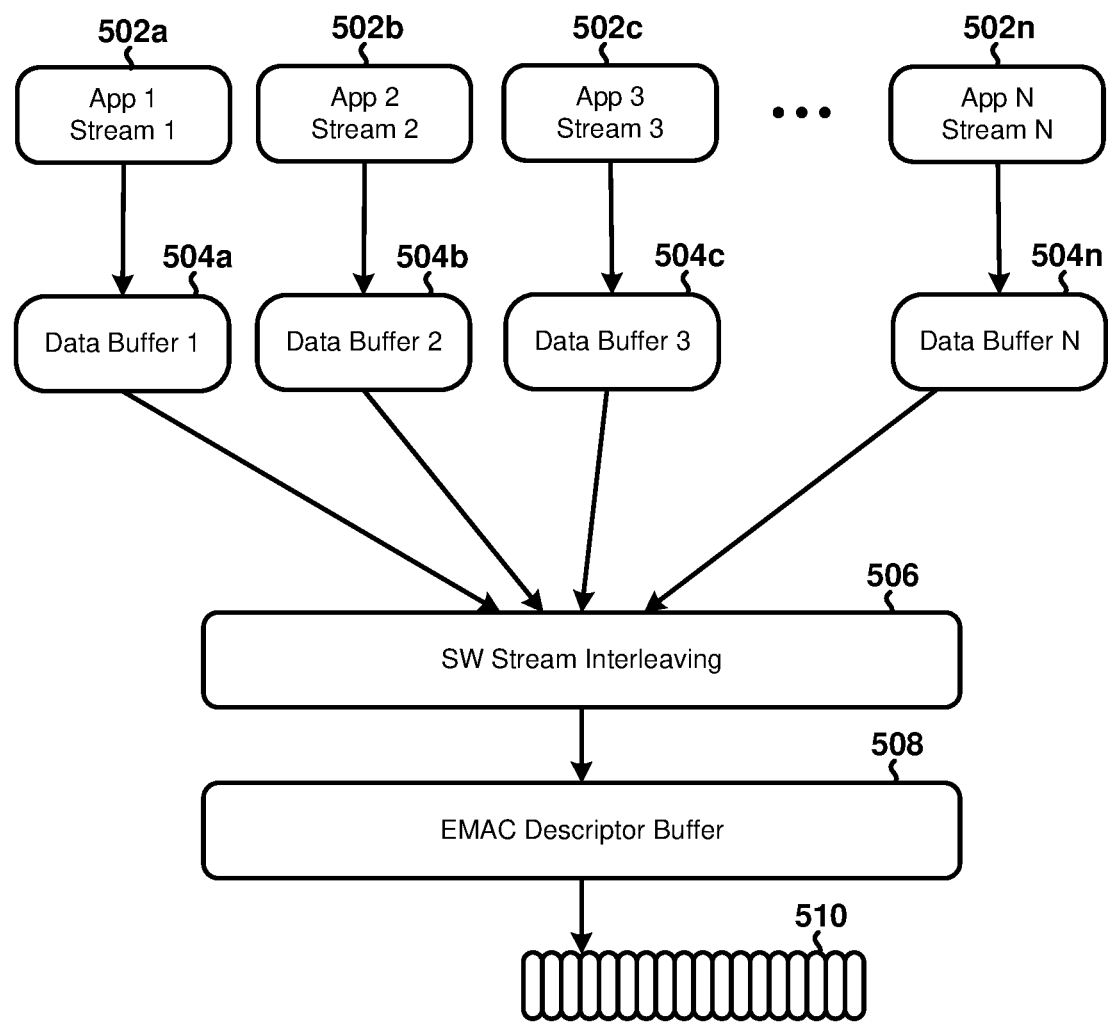
FIG. 5A is a component block diagram that illustrates a software-based interleaving solution for communicating packets.
Figure 5B:
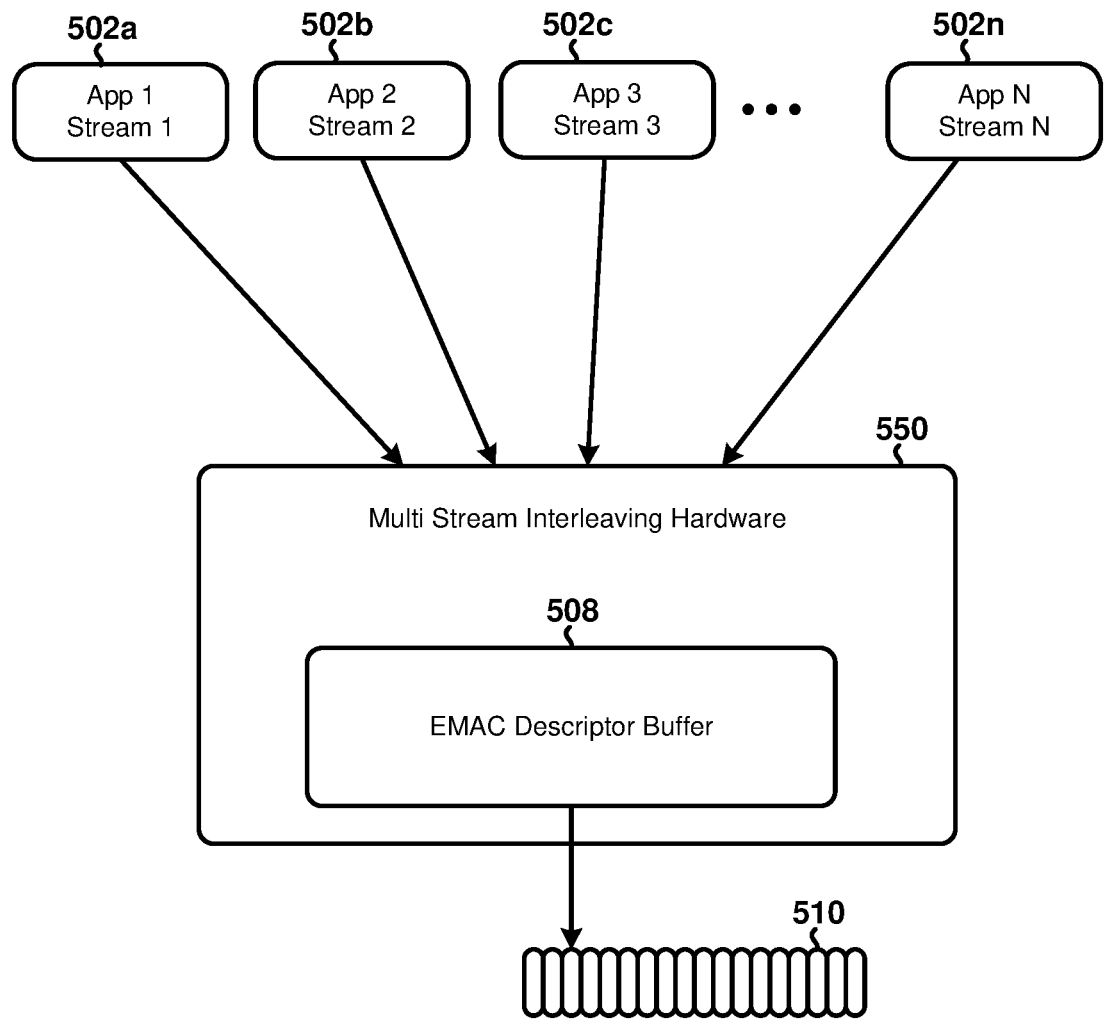
FIG. 5B is a component block diagram that illustrates a hardware-based interleaving solution in accordance with the embodiments.

FIGS. 4A-4C are timing diagrams that illustrate examples of Class A streaming in accordance with some embodiments. FIG. 5A illustrates a software-based interleaving solution for communicating packets, which includes applications 502*a*-502*n*, data buffers 504*a*-504*n*, a software stream interleaving 506 component and an EMAC descriptor buffer 508 configured to communicate packets 510. FIG. 5B illustrates a hardware-based interleaving solution that includes a multi stream interleaving hardware 550 that includes the EMAC descriptor buffer 508.

With reference to FIGS. 1A-5B, streaming eight thousand (8000) packets per second (for Class A) requires 125 microsecond gap between each of the packets. To accomplish such streams, a software thread would need to wake up every 1.5 microseconds to send eight (8) packets. Yet, causing software to wake up in every 1.5 microseconds interval is a technically challenging task that could consume a significant amount of the device's limited resources (e.g., processing resources, etc.).

In the example illustrated in FIG. 4A, the software wakes up every one (1) millisecond, creates eight (8) packets, adds a timestamp to the packets, and sends the packets to EMAC hardware. The EMAC hardware may schedule so that there is 125 microsecond gap between each of the packets. For example, the EMAC hardware may receive the packets, wait until the current time exceeds the timestamp time (i.e., wait for the time to become current), and commence sending the packets in response to determining that the current time exceeds the timestamp time.

FIGS. 4B and 4C illustrate some of the challenges with implementing Class A streaming using the software-based interleaving solution illustrated in FIG. 5B. In particular, FIG. 4B illustrates challenges with implementing Class A streaming for a single stream, and FIG. 4C illustrates challenges with implementing Class A streaming for multiple streams. In both cases, software scheduling is not highly accurate and there are delays that could prevent all of the packets that should be sent within an interval from being sent within that interval. In practice, the software does not wake up exactly at every one (1) millisecond interval, which causes delays that could result in a missed interval 404. The EMAC descriptor buffer 508 may attempt to compensate for the delays so that all the packets are sent within the correct interval. This may result in prioritizing some of the packets (by sending them in bursts, such as the bursts 403 illustrated in FIG. 4B) and sending the others in equal increments. Further, each subsequent scheduling delay may add further delays, resulting in a missed interval 404. In addition, the delays may cause the system to experience intervals 406 that include random packet rates in which the packets are sent at random intervals (e.g., some are sent in burst and others are not). A random packet rate 406 may result in the packets not being synchronized across streams and/or the packets not reaching their destination in the required time.

With reference to FIGS. 1A-5B, the software threads (applications 502*a-n*) fill the descriptor at independent times. The EMAC descriptor buffer 508 is filled back-to-back, and the times of the packets 510 are unsorted, misaligned (i.e., received out of sequence), and/or not synchronized across streams. There timestamps are placed in each packet descriptor, but the packets are not sorted by the timestamps. This may cause various issues on the Ethernet network, including dropped packets and/or unsynchronized streams.

Figure 6A:
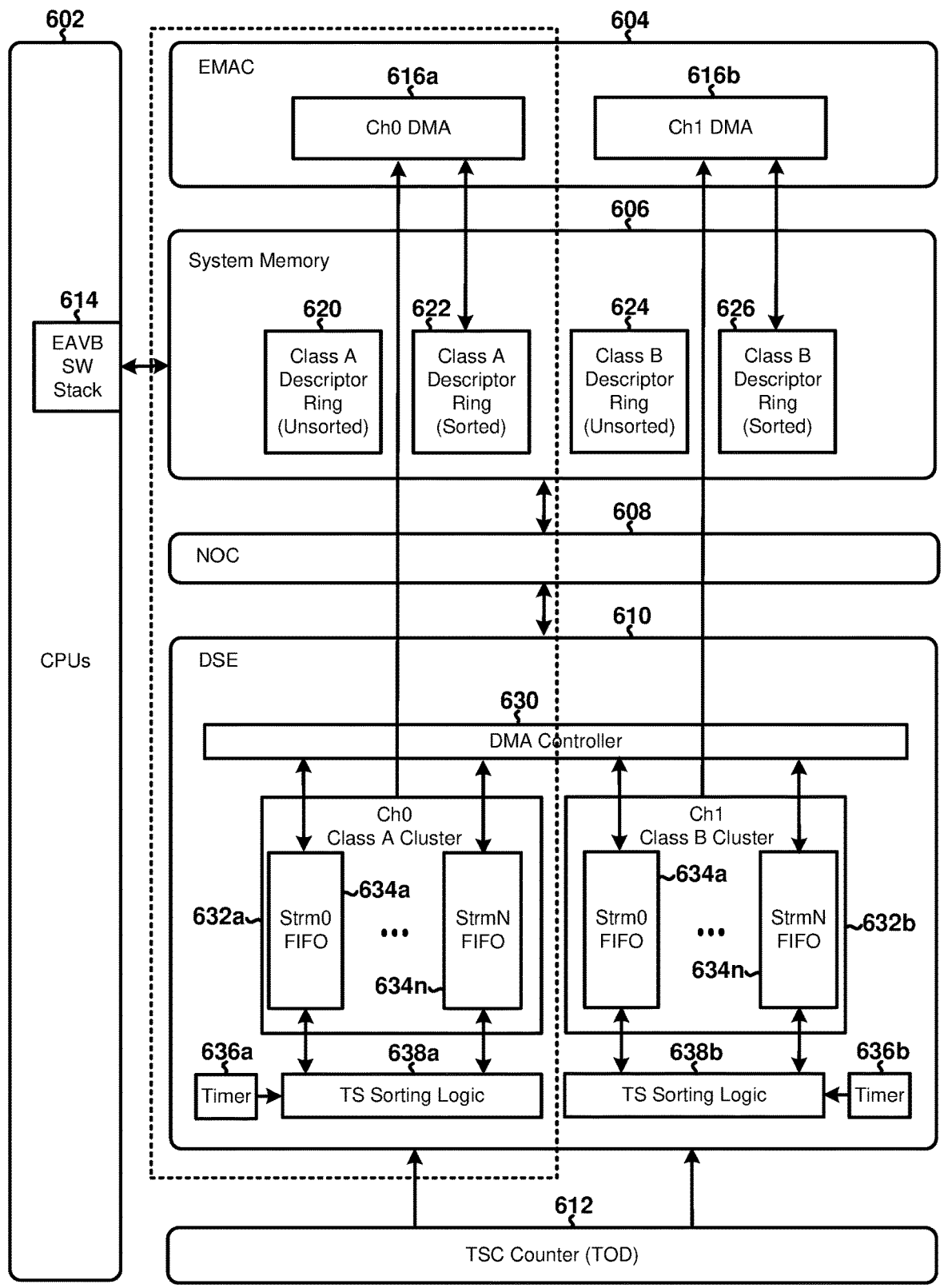
FIG. 6A is a component block diagram that illustrates a hardware-based descriptor sorting engine (DSC) system that could be configured to sort and synchronize the packets in accordance with some embodiments.

FIG. 6A illustrates a hardware-based system that could be configured to sort and synchronize the packets to overcome the challenges with implementing Class A streaming over Ethernet in an automobile in accordance with some embodiments. It should be understood that the system illustrated in FIG. 6A is scalable hardware and may include multiple sorting engines to simultaneously support multiple channels, multiple streams, and multiple different stream classes. For brevity and focus the discussion on most relevant details, the example illustrated in FIG. 6A includes hardware for processing class A and class B streams, and the example below describes processing a class A stream. However, nothing in this application should be used to limit the claims to processing a class A streams.

With reference to FIGS. 1A-6A, the hardware-based system includes a CPU 602 component, an EMAC 604 component, system memory 606, a network on chip (NOC) 608, a descriptor sorting engine (DSE) 610 component, and a time stamp counter (TSC) and time of day (TOD) clock 612 component.

The CPU 602 component may include an EAVB software stack 614. The EMAC 604 includes various channel direct memory access (DMA) components 616*a*, 616*b*. The system memory 606 may include an unsorted Class A descriptor ring memory 620, a sorted Class A descriptor ring memory 622, an unsorted Class B descriptor ring memory 624, and a sorted Class B descriptor ring memory 626. The DSE 610 component includes a DMA controller 630, channel clusters 632*a*, 632*b* that each include first-in first-out (FIFO) memories 634*a*-634*n* for each channel or stream, timers 636*a*, 636*b* and time stamp (TS) sorting logic components 638*a*, 638*b*.

In overview, for multi-stream scenarios, each application or eAVB software thread submits multiple packets (example: 8 audio packets equivalent to 1 msec duration) into an eMAC driver, which may then write packets and eMAC descriptors into the unsorted Class A descriptor ring memory 620. These descriptors are unsorted as they come from different threads which are not time aligned. Packet descriptors may include a timestamp that indicates a time or time sequence in which the packet should be rendered. By reordering packets that are received out of order (i.e., not time aligned) based on timestamp values, packets can be processed according to the streaming sequence. In overview, the DMA controller 630 may be configured to read and write to each block in the system memory 606. The DMA controller 630 may pull timestamps from the packet descriptors in the unsorted Class A descriptor ring memory 620 and store the timestamps in the FIFO memories 634a-634n in conjunction with a pointer that points to a descriptor memory location that stores a descriptor that includes a timestamp. That is, the DMA controller 630 may pull timestamp-pointer pairs from packet descriptors stored in an unsorted descriptor ring memory. The TS sorting logic 638a-638b component may reorder the timestamps and associated pointers so that the pairs are sorted in ascending order based on timestamp values within a brief (e.g., 1 millisecond, etc.) period of time. TS sorting logic 638a-638b component may then trigger the DMA controller 630 to use the sorted pointers to retrieve the full packet descriptors and store them in a sorted order in the sorted Class A descriptor ring memory 622. The sorted Class A descriptor ring memory 622 may be a small memory buffer suitable for storing data for only one millisecond worth of time (or 2, 4, 8 milliseconds for other classes, etc.). The DMA controller 630 may then trigger the channel DMA 616a, 616b to read data from the sorted Class A descriptor ring memory 622, and the send the data via the Ethernet network.

The TSC counter 612 may synchronize the timers 636a-636b with the network clock and/or to the TOD. The EAVB software stack 322 may configure the timers 636a, 636b and periodically trigger the TS sorting logic 638a-638b right before each one millisecond time slot. The EAVB software stack 322 may determine time windows by determining the amount time remaining (e.g., 50 microseconds, etc.) before the sorting is to be finished so that the sorted descriptors may be available in the sorted Class A descriptor ring memory 622 and DMA controller 630 may start sending the data over the Ethernet.

The EAVB software stack 322 may trigger the timer 636a-636b, the timer 636a-636b may trigger the TS sorting logic 638a-638b, the TS sorting logic 638a-638b may trigger the channel clusters 632a-632b, which may trigger the DMA to read all or a portion of the descriptors from the unsorted Class A descriptor ring memory 620. Since the descriptor may be large (e.g., 32 bytes, etc.), in some embodiments the DMA may be configured to ready only few parameters from each descriptor. As a more detailed example, the system may include a pointer that points to the descriptor location in the unsorted Class A descriptor ring memory 620, and each descriptor may include a four-byte timestamp. Since the duration is not likely to exceed a few milliseconds, the DMA may be configured to read only the lower two bytes of the four-byte timestamp.

The DMA may store the data retrieved from the unsorted Class A descriptor ring memory 620 into the FIFO memories 634a-634n, and the TS sorting logic 638a-638b may sort all the descriptors in the ascending order so that the most recent time stamp may be placed on the top of the FIFO memory 634. When the sorting is complete, the TS sorting logic 638a-638b may trigger the DMA controller 630 to fetch the sorted descriptor information from the FIFO memories 634a-634n and transfer them to the sorted Class A descriptor ring memory 622.

Thus, the DSE 610 may sort the descriptors before handing them over to EMAC 604 component. The eMAC driver configures the DMA and timer in the descriptor sorting engine. When the timer expires (sorting trigger event) DMA reads descriptors header and extracts gPTP timestamp (32 bit) from system memory (DDR) for each descriptor and stores it in the local FIFO along with the associated descriptor address pointer.

The descriptor timestamps may be sorted according to their launch time, the most recent time stamp descriptor is placed on the top of the FIFO. Once the descriptor sorting is completed it triggers DMA to read the full content for each descriptor from the unsorted buffer and transfer them to sorted buffer. eMAC reads the sorted descriptors for pushing packets out to the network through eMAC internal DMA channels. In some embodiments, this solution may be applied when there is no opportunity to modify EMAC IP (i.e., eMAC IP may be licensed from 3rd party).

Figure 6B:
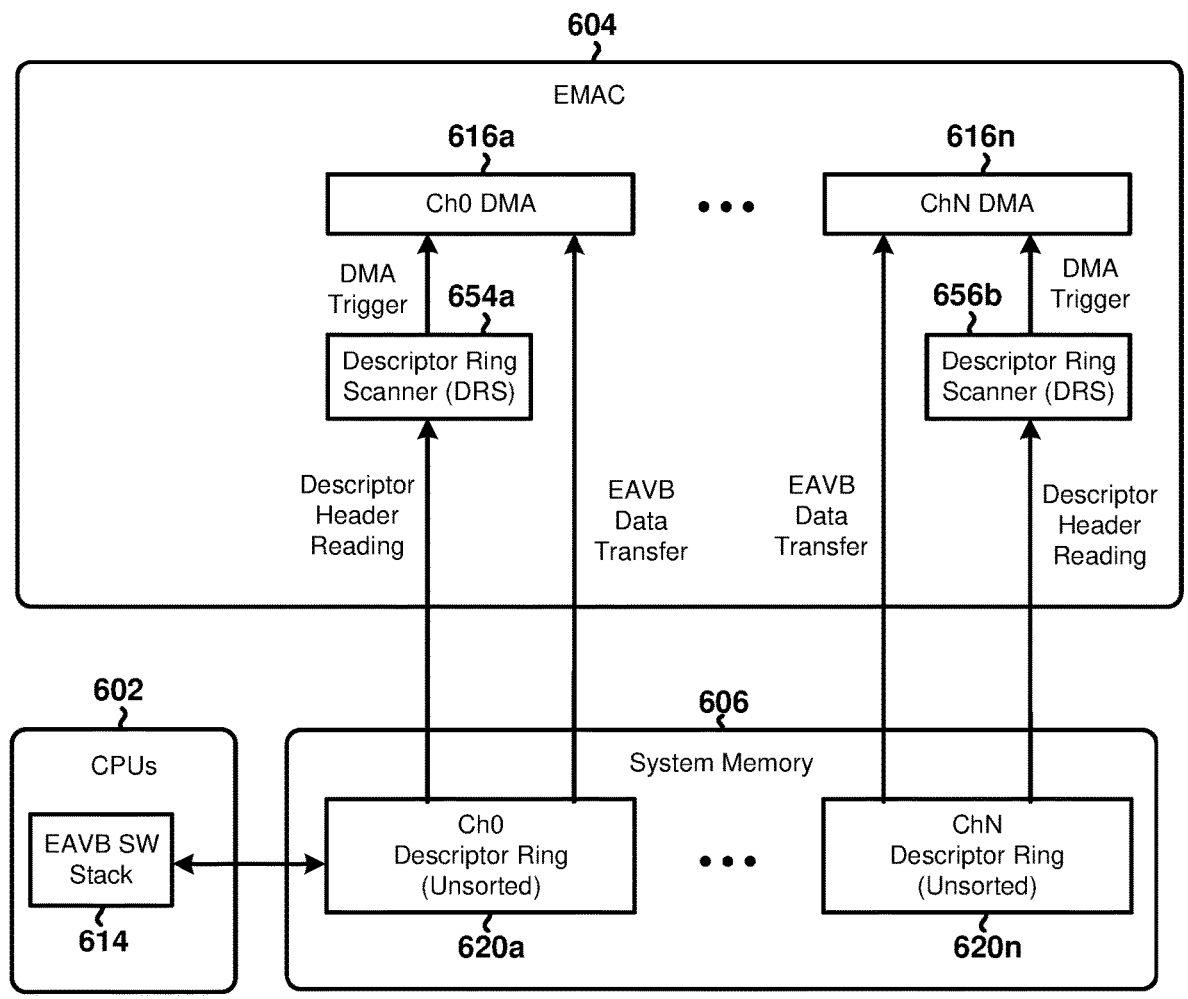
FIG. 6B is a component block diagram that illustrates a system that includes a dedicated descriptor ring scanner (DRS) hardware in accordance with some embodiments.

With reference to FIGS. 1A-6B, a system that includes a dedicated descriptor ring scanner (DRS) 654a, 654b hardware inside the EMAC 604 that is suitable for use when there is an opportunity to modify the EMAC hardware IP return-to-zero (RZ) is illustrated in FIG. 6B. The DRS 654a, 654b hardware allows a DMA channel 616a-616n in the in the sorting engine to sort the streams and place them in the proper order so that one engine data management (EDM) channel can transfer the data. Some embodiments may use DRS for hardware based eAVB packet/descriptor sorting to streamline and transfer the packets as per the gPTP time embedded in the eAVB packets.

In multi-stream scenarios, each application or eAVB software thread submits multiple packets (example: 8 audio packets equivalent to 1 msec duration) into eMAC driver which then writes packets into system memory (eMAC descriptors). These descriptors are unsorted as they come from different threads that are not time aligned. The DRS 654a, 654b hardware may fetch the descriptor header pointed by the descriptor ring buffer 620a-620n read index (local to DRS 654a, 654b hardware), extract the gPTP timestamp embedded in descriptor header, and compare the timestamp with current gPTP time to determine whether the gPTP timestamp is elapsed. In response to determining that the gPTP timestamp is elapsed, the DRS 654a, 654b hardware may trigger DMA 616a-616n of current descriptor and transfer the eAVB packet on the network. The DRS 654a, 654b hardware may increment the ring buffer read index and repeat the above operations for entire descriptor ring.

Figure 7:
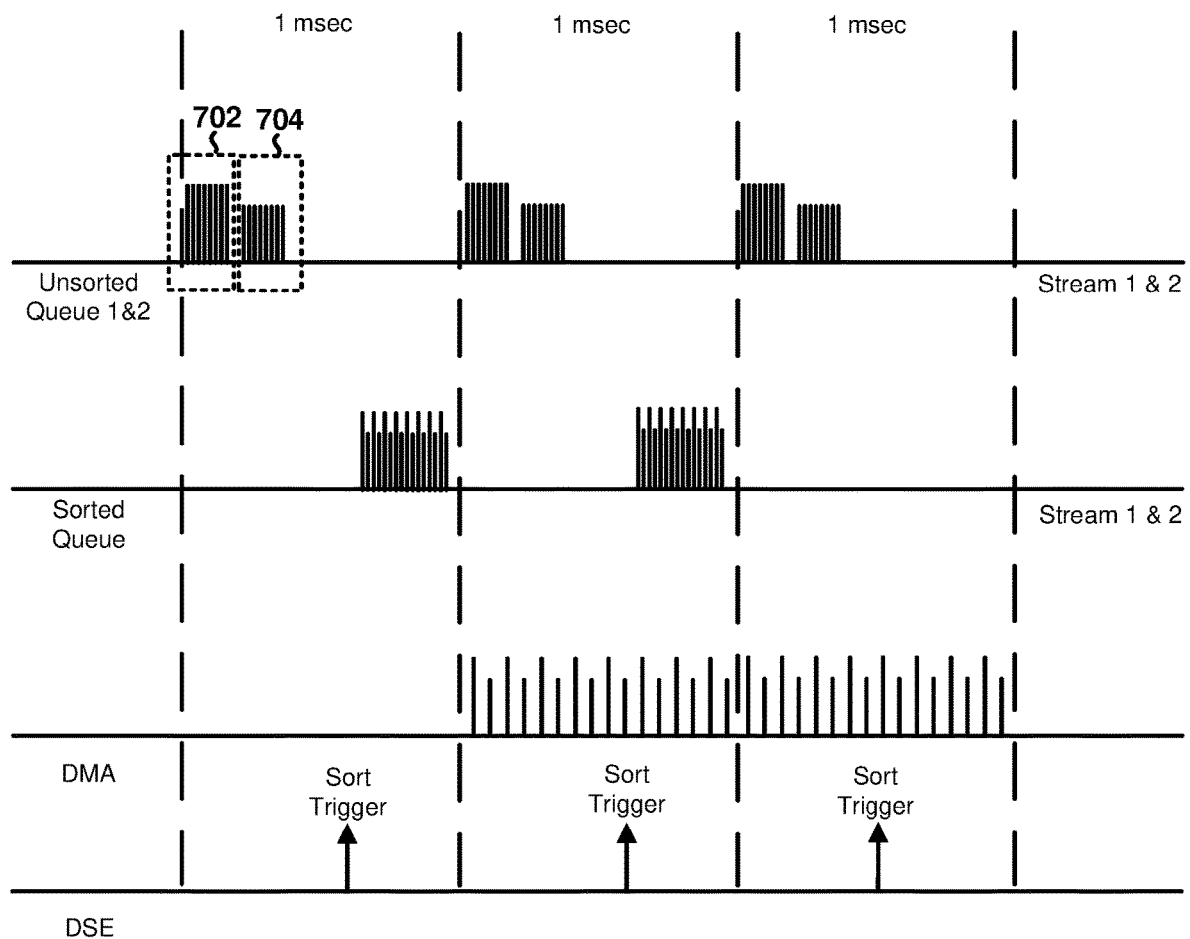
FIGS. 7-9 are timing diagrams that illustrate the progression of packets from different streams in system that implements the various embodiments.
Figure 8:
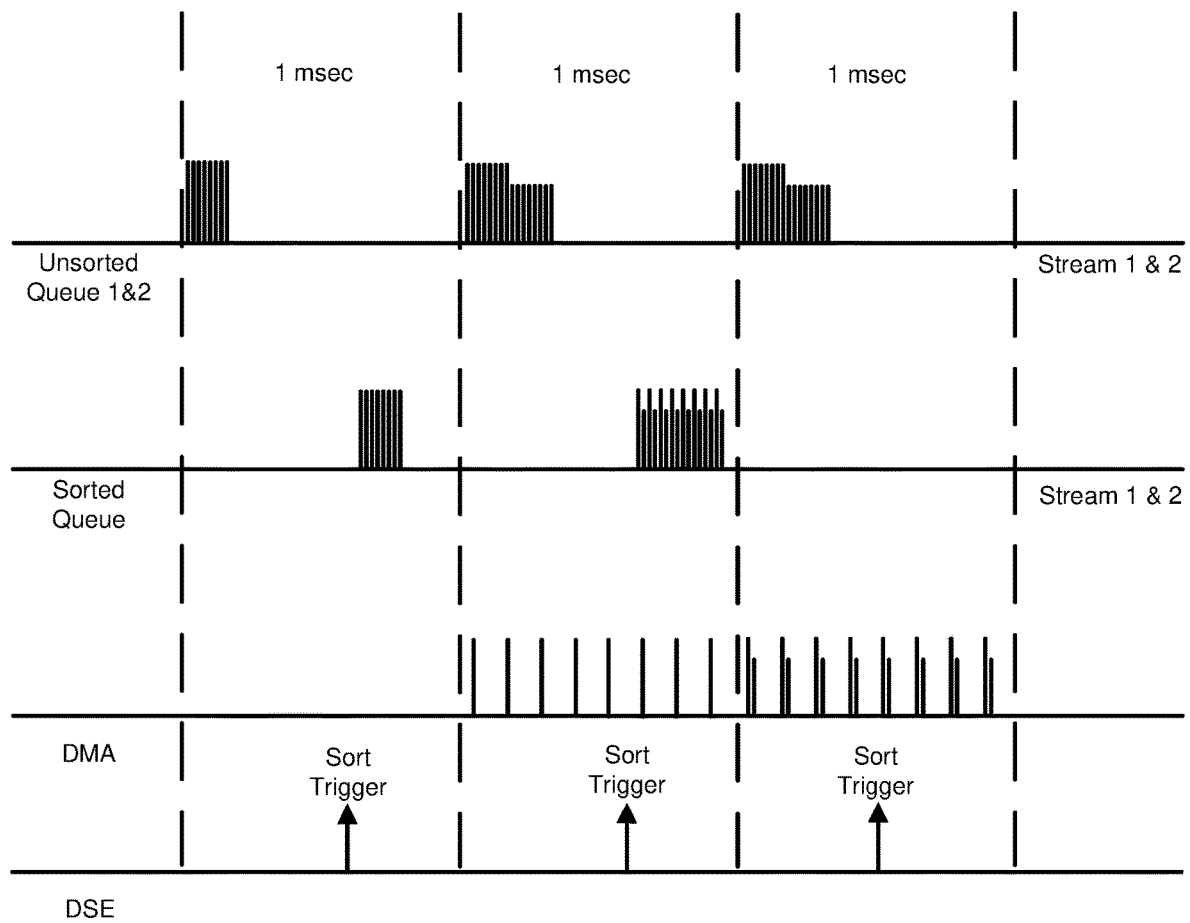
Figure 9:
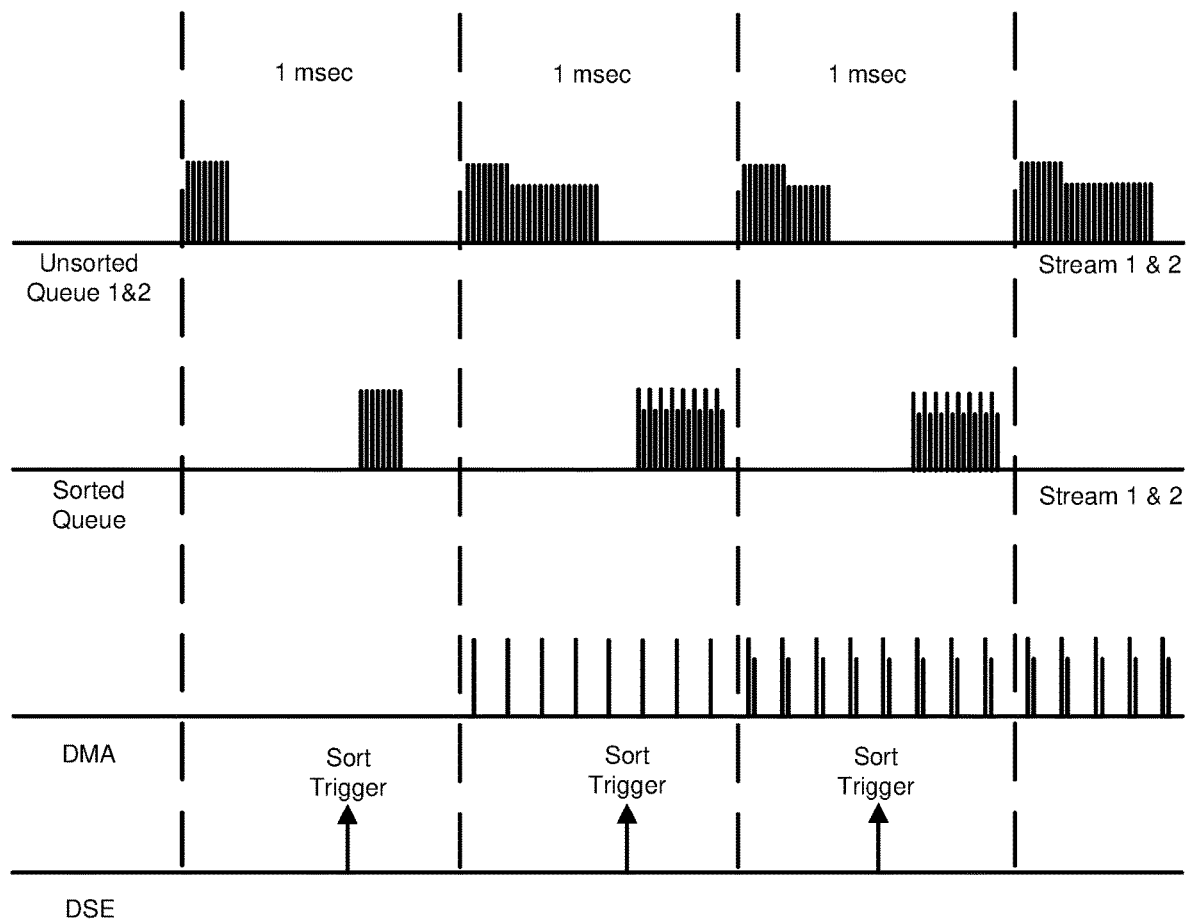

FIGS. 7-9 are timing diagrams that illustrate packets from different streams as they progress from an unsorted queue, to sorted queue to the Ethernet DMA based on sort triggers generated by the DSE 610. In the examples illustrated in FIGS. 7-9, different line lengths (e.g., long and short bars) are used to differentiate different packet streams. FIG. 7 illustrates timing for two packet streams 702, 704 that start at the same time and are scheduled at a 1 ms interval. FIG. 8 illustrates timing for two streams of packets that are scheduled at a 1 ms interval, and in which the second stream starts with a 1 ms delay. FIG. 9 illustrates timing for two streams of packets, in which the first stream is scheduled at a 1 ms interval, and the second stream is scheduled at a 2 ms interval.

Figure 10:
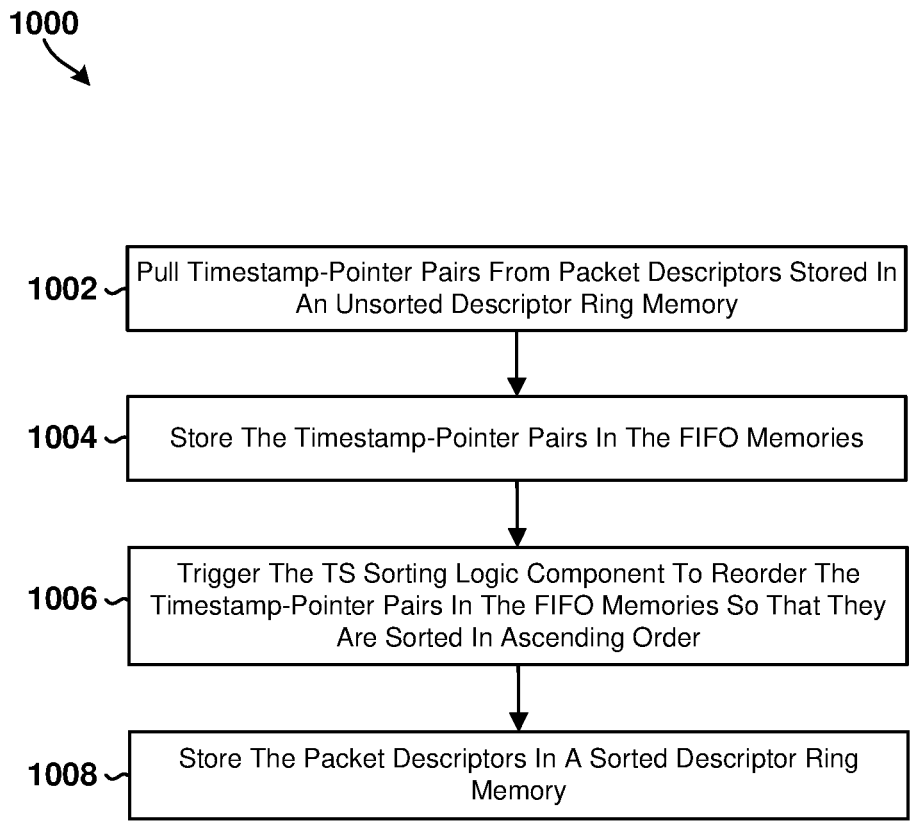
FIGS. 10-13 are process flow diagrams illustrating methods of operating a hardware-based packet sorting engine in accordance with various embodiments.

FIG. 10 illustrates a method 1000 of operating a DSE 610 in accordance with some embodiments. With reference to FIGS. 1A-10, in block 1002, the DSE 610 may pull time stamp-pointer pairs from packet descriptors stored in an unsorted descriptor ring memory (e.g., unsorted Class A descriptor ring memory 620). In block 1004, the DSE 610 may store the timestamp-pointer pairs in memory (e.g., FIFO memories 634). In block 1006, the DSE 610 may trigger the TS sorting logic 638*a*-638*b* component to reorder the timestamp-pointer pairs in ascending order. In block 1006, the DSE 610 may store the packet descriptors in a sorted descriptor ring memory (e.g., sorted Class A descriptor ring memory 622). The sorted descriptor ring memory may be a small memory buffer suitable for storing data for only storing a small amount of data (e.g., data for transmitting 1, 2, 4, or 8 milliseconds, etc.).

Figure 11:
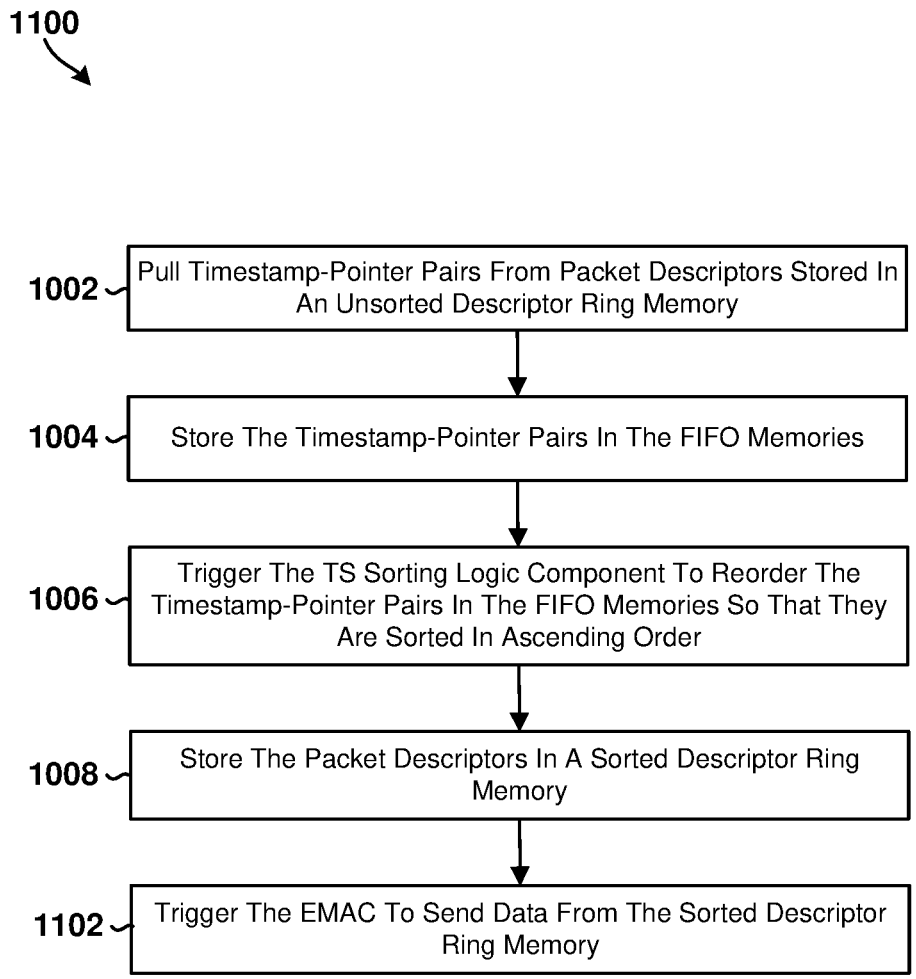

FIG. 11 illustrates a method 1100 of operating a DSE 610 in accordance with some embodiments. With reference to FIGS. 1A-11, in blocks 1002-1008, the DSE 610 may perform the operations discussed above with reference to FIG. 10. In block 1102, the DSE 610 may trigger the EMAC to send data from the sorted descriptor ring memory (e.g., sorted Class A descriptor ring memory 622).

Figure 12:
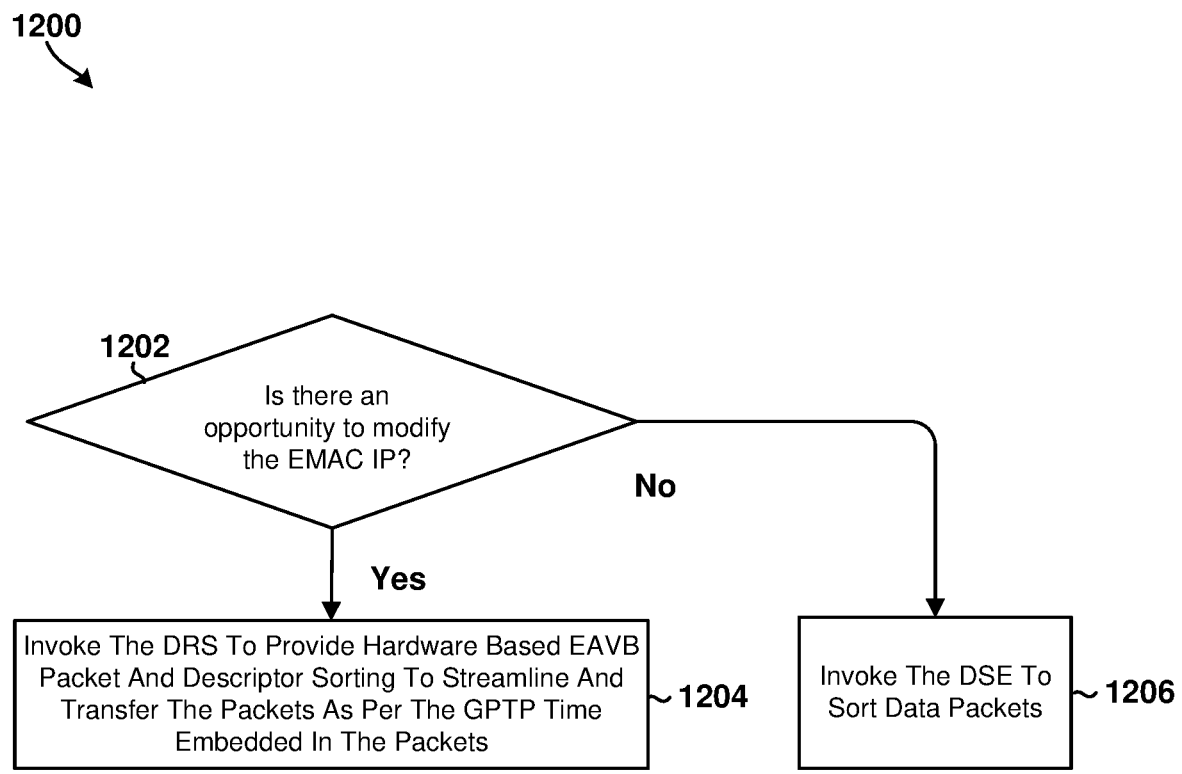

FIG. 12 illustrates a method 1200 of operating a network device in accordance with some embodiments. With reference to FIGS. 1A-12, in determination block 1202, the network device may determine whether there is an opportunity to modify the EMAC IP. In response to determining that the there is an opportunity to modify the EMAC IP (i.e., determination block 1202="Yes"), the network device may invoke the DRS 654*a*-654*n* to provide hardware based eAVB packet and descriptor sorting to streamline and transfer the packets as per the gPTP time embedded in the packets in block 1204. In response to determining that the there is no opportunity to modify the EMAC IP (i.e., determination block 1202="No"), the network device may invoke the DSE to sort data packets in block 1206 and/or to perform methods 1000 or 1100.

Figure 13:
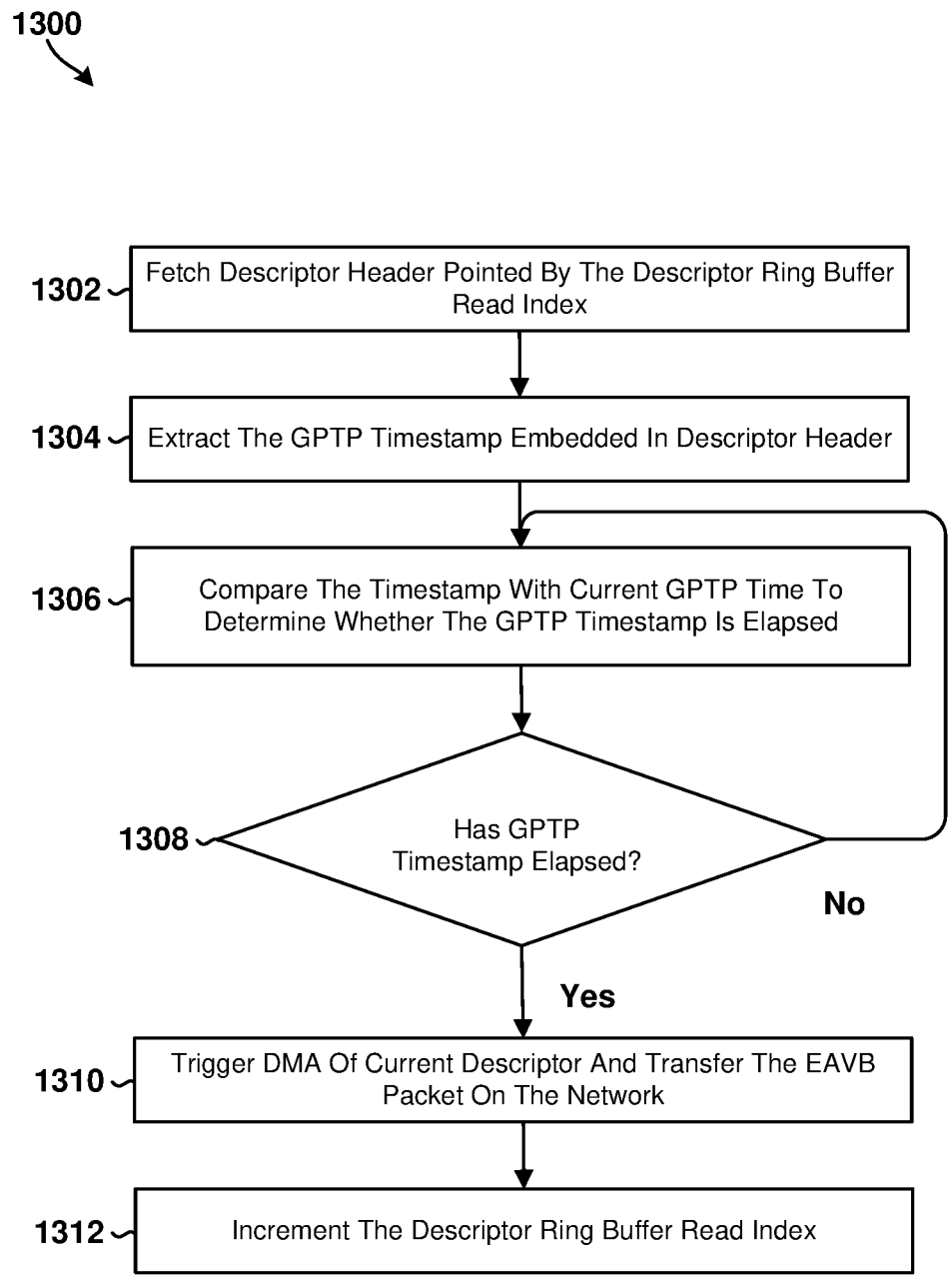

FIG. 13 illustrates a method 1300 of using a DRS 654*a*-654*n* in accordance with some embodiments. With reference to FIGS. 1A-13, in block 1302, the DRS 654*a*-654*n* hardware may fetch a descriptor header pointed by the descriptor ring buffer 620 read index (local to DRS 654*a*-654*n* hardware). In block 1304, the DRS 654*a*-654*n* hardware may extract the gPTP timestamp embedded in descriptor header. In block 1306, the DRS 654*a*-654*n* hardware may compare the timestamp with current gPTP time to determine whether the gPTP timestamp is elapsed. In determination block 1308, the DRS 654*a*-654*n* hardware may determine whether the gPTP timestamp is elapsed. In response to determining that the gPTP timestamp has not elapsed (i.e., determination block 1308="No"), the DRS 654*a*-654*n* hardware may wait for a predetermined time periods and compare the compare the timestamp with current gPTP time again in block 1306.

In response to determining that the gPTP timestamp has elapsed (i.e., determination block 1308="Yes"), the DRS 654*a*-654*n* hardware may trigger DMA 616*a*-616*n* of the current descriptor and transfer the eAVB packet on the network in block 1310. In block 1312, the DRS 654*a*-654*n* hardware may increment the ring buffer read index. The DRS 654*a*-654*n* hardware may repeat the above operations 1302-1312 for each channel descriptor ring 620*a*-620*n*.

Figure 14:
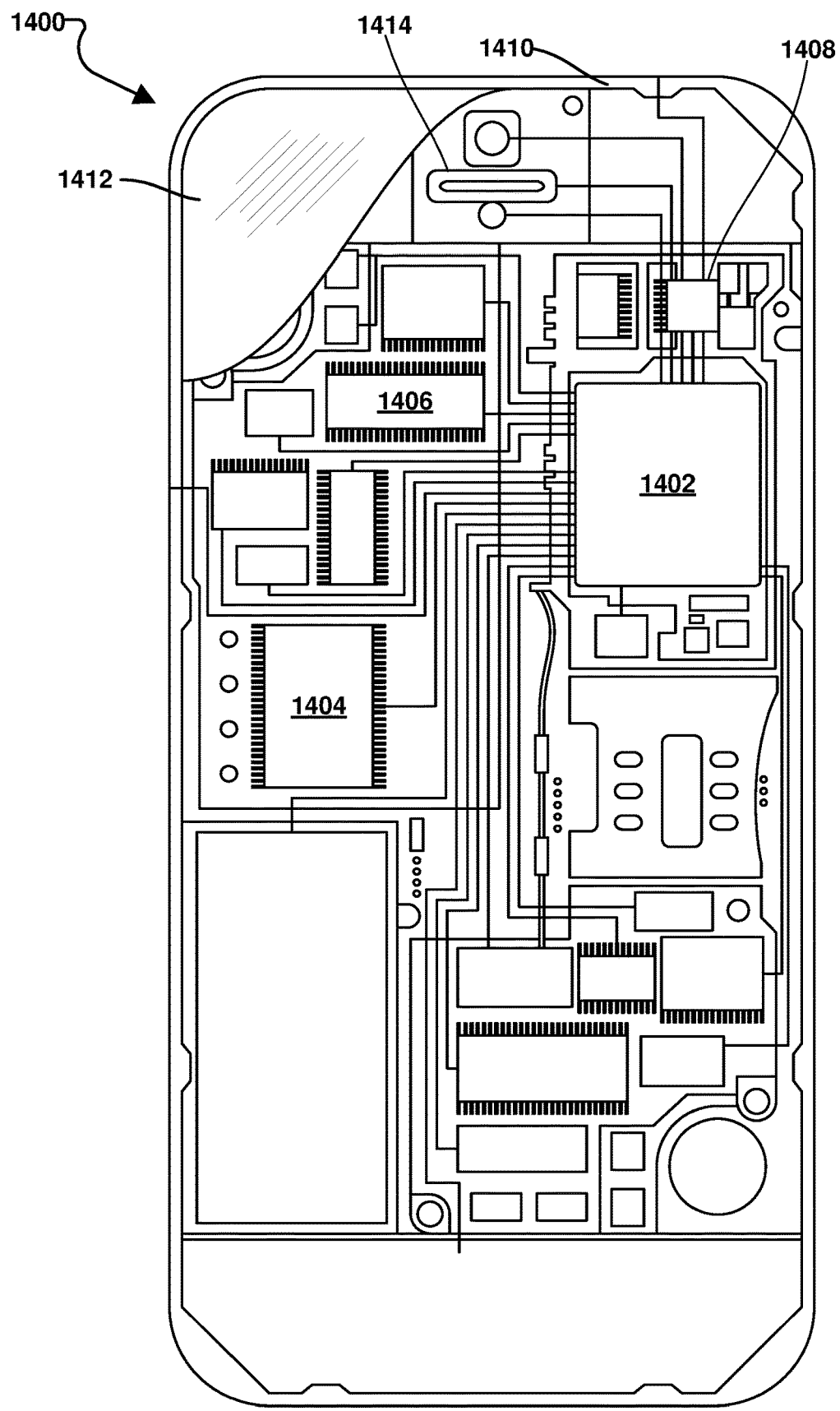
FIG. 14 is a component block diagram illustrating a vehicle display unit in accordance with some embodiments.

The various embodiments may be implemented on a variety of electronic components in a vehicle, an example of which is illustrated in FIG. 14 in the form of a vehicle display unit 1400. A vehicle display unit 1400 may include a processor 1402 coupled to internal memory 1404, a display 1412, and to a speaker 1414. Additionally, the vehicle display unit 1400 may include an antenna 1410 for sending and receiving electromagnetic radiation that may be connected to a wireless data link and/or cellular telephone transceiver 1408 coupled to the processor 1402. The vehicle display unit 1400 may also include menu selection buttons or rocker switches for receiving user inputs.

A vehicle display unit 1400 could include a sound encoding/decoding (CODEC) circuit 1406, which digitizes sound received from a microphone into data packets suitable for wireless transmission and decodes received sound data packets to generate analog signals that are provided to the speaker to generate sound. Also, one or more of the processor 1402, wireless transceiver 1408 and CODEC 1406 may include a digital signal processor (DSP) circuit (not shown separately).

The processors 1402 may be any programmable microprocessor, microcomputer or multiple processor chip or chips that can be configured by software instructions (applications) to perform a variety of functions, including the functions of the various embodiments described below. In some mobile devices, multiple processors 1402 may be provided, such as one processor dedicated to wireless communication functions and one processor dedicated to running other applications. Typically, software applications may be stored in the internal memory 1404 before they are accessed and loaded into the processor 1402. The processor 1402 may include internal memory sufficient to store the application software instructions.

Implementation examples are described in the following paragraphs. While some of the following implementation examples are described in terms of example methods, further example implementations may include: the example methods discussed in the following paragraphs implemented by a computing device for use in a vehicle including a primary boot processor configured with processor-executable instructions to perform operations of the methods of the following implementation examples; the example methods discussed in the following paragraphs implemented by a computing device for use in a vehicle including means for performing functions of the methods of the following implementation examples; and the example methods discussed in the following paragraphs may be implemented as a non-transitory processor-readable storage medium having stored thereon processor-executable instructions configured to cause a processor of a computing device for use in a vehicle to perform the operations of the methods of the following implementation examples.

Example 1. A network device including a descriptor sorting engine (DSE). The DSE including a direct memory access (DMA) controller, a memory organized by channel clusters that each include a plurality of first-in first-out (FIFO) memories, and a time stamp (TS) sorting logic component in which the DMA controller is configured to pull timestamp-pointer pairs from packet descriptors stored in an unsorted descriptor ring memory, trigger the TS sorting logic component to reorder the timestamp-pointer pairs in the FIFO memories so that they are sorted in ascending order, and store the packet descriptors in a sorted descriptor ring memory.

Example 2. The network device of example 1 further including an Ethernet media access controller (EMAC), and the DMA controller being configured to: store the timestamp-pointer pairs in the FIFO memories, use the sorted timestamp-pointer pairs in the FIFO memories to read the packet descriptors stored in an unsorted descriptor ring memory, and trigger the EMAC to send data from the sorted descriptor ring memory.

Example 3. The network device of either of examples 1 or 2, further including a processor configured to invoke the DSE to sort data packets in response to determining that there is no opportunity to modify the EMAC Internet protocol (EMAC IP).

Example 4. The network device of example 2 in which the EMAC includes a dedicated descriptor ring scanner (DRS), and the network device includes a processor that is configured to invoke the DRS in response to determining that there is an opportunity to modify the EMAC hardware IP return-to-zero (RZ).

Example 5. The network device of example 4 in which invoking DRS hardware causes the DRS hardware to fetch a descriptor header pointed by a descriptor ring buffer read index, compare a timestamp embedded in the descriptor header with a current time to determine whether the timestamp has elapsed, trigger a DMA controller of a current descriptor to transfer packets on a network in response to determining that the timestamp is elapsed, and increment the descriptor ring buffer read index.

Example 6. The network device of any of examples 1-5 in which the data stored in the sorted descriptor ring memory is audio data.

Example 7. The network device of any of examples 1-6 in which the data stored in the sorted descriptor ring memory includes video data.

Example 8. The network device of any of examples 1-5 in which the data stored in the sorted descriptor ring memory is time sensitive networking data.

Example 9. A method performed by one or more processors of an automobile network device, including: pulling timestamp-pointer pairs from packet descriptors stored in an unsorted descriptor ring memory; storing the timestamp-pointer pairs in the FIFO memories; triggering the TS sorting logic component to reorder the timestamp-pointer pairs in the FIFO memories so that the timestamp-pointer pairs are sorted in ascending order; using the sorted timestamp-pointer pairs in the FIFO memories to read the packet descriptors stored in an unsorted descriptor ring memory; and storing the packet descriptors in a sorted descriptor ring memory.

Example 10. The method of example 9, further including triggering an Ethernet media access controller (EMAC) to stream data from the sorted descriptor ring memory.

Example 11. The method of example 10, further including invoking sorting of data packets in response to determining that there is no opportunity to modify the EMAC Internet protocol (EMAC IP).

Example 12. The method of either of examples 10 or 11, further including invoking a dedicated descriptor ring scanner (DRS) hardware in response to determining that there is an opportunity to modify the EMAC Internet protocol (EMAC IP).

Example 13. The method of example 12, wherein invoking the DRS hardware includes: fetching a descriptor header pointed by a descriptor ring buffer read index; comparing a timestamp embedded in the descriptor header with a current time to determine whether the timestamp has elapsed; triggering a direct memory access (DMA) controller of a current descriptor to transfer packets on a network in response to determining that the timestamp is elapsed; and incrementing the descriptor ring buffer read index.

Example 14. The method of any of examples 9-13, wherein the data stored in the sorted descriptor ring memory is audio data.

Example 15. The method of any of examples 9-14, wherein the data stored in the sorted descriptor ring memory includes video data.

Example 16. The method of any of examples 9-13, wherein the data stored in the sorted descriptor ring memory is time sensitive networking data.

A number of different types of memories and memory technologies are available or contemplated in the future, any or all of which may be included and used in systems and computing devices that implement the various embodiments. Such memory technologies/types may include non-volatile random-access memories (NVRAM) such as Magnetoresistive RAM (M-RAM), resistive random access memory (ReRAM or RRAM), phase-change random-access memory (PC-RAM, PRAM or PCM), ferroelectric RAM (F-RAM), spin-transfer torque magnetoresistive random-access memory (STT-MRAM), and three-dimensional cross point (3D-XPOINT) memory. Such memory technologies/types may also include non-volatile or read-only memory (ROM) technologies, such as programmable read-only memory (PROM), field programmable read-only memory (FPROM), one-time programmable non-volatile memory (OTP NVM). Such memory technologies/types may further include volatile random-access memory (RAM) technologies, such as dynamic random-access memory (DRAM), double data rate (DDR) synchronous dynamic random-access memory (DDR SDRAM), static random-access memory (SRAM), and pseudostatic random-access memory (PSRAM). Systems and computing devices that implement the various embodiments may also include or use electronic (solid-state) non-volatile computer storage mediums, such as FLASH memory. Each of the above-mentioned memory technologies include, for example, elements suitable for storing instructions, programs, control signals, and/or data for use in or by a vehicle's advanced driver assistance system (ADAS), system on chip (SOC) or other electronic component. Any references to terminology and/or technical details related to an individual type of memory, interface, standard or memory technology are for illustrative purposes only, and not intended to limit the scope of the claims to a particular memory system or technology unless specifically recited in the claim language.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

As used in this application, the terms "component," "comparator," "encoder," "element" "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a computing device and the computing device may be referred to as a component. One or more components may reside within a process and/or thread of execution, and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a multiprocessor, but, in the alternative, the processor may be any conventional processor, controller, microcontroller, or state machine. A processor may also be implemented as a combination of computing devices, e.g., a combination of a DSP and a multiprocessor, a plurality of multiprocessors, one or more multiprocessors in conjunction with a DSP core, or any other such configuration. Alternatively, some steps or methods may be performed by circuitry that is specific to a given function.

In one or more exemplary embodiments, the functions described may be implemented in hardware, software, firmware, or any combination thereof. If implemented in software, the functions may be stored as one or more processor-executable instructions or code on a non-transitory computer-readable storage medium or non-transitory processor-readable storage medium. The steps of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the claims are not intended to be limited to the embodiments shown herein but are to be accorded the widest scope consistent with the following claims and the principles and novel features disclosed herein.

What is claimed is:

1. An automobile network device, comprising:
a descriptor sorting engine (DSE), the DSE engine comprising:
   a memory organized by channel clusters that each include first-in first-out (FIFO) memories;
   a time stamp (TS) sorting logic component; and
   a direct memory access (DMA) controller coupled to the memory and the TS sorting logic component, wherein the DMA controller is configured to:
      pull timestamp-pointer pairs from packet descriptors stored in an unsorted descriptor ring memory;
      trigger the TS sorting logic component to reorder the timestamp-pointer pairs in the FIFO memories so that the timestamp-pointer pairs are sorted in ascending order; and
      store the packet descriptors in a sorted descriptor ring memory;
an Ethernet media access controller (EMAC) coupled to the DMA controller, wherein the DMA controller is further configured to:
   store the timestamp-pointer pairs in the FIFO memories prior to triggering the TS sorting logic component to reorder the timestamp-pointer pairs in the FIFO memories so that the timestamp-pointer pairs are sorted in ascending order;
   use the sorted timestamp-pointer pairs in the FIFO memories to read the packet descriptors stored in an unsorted descriptor ring memory prior to storing the packet descriptors in the sorted descriptor ring memory; and
   trigger the EMAC to stream data from the sorted descriptor ring memory; and
a processor configured to invoke the DSE to sort data packets in response to determining that there is no opportunity to modify the EMAC Internet protocol (EMAC IP).

2. The automobile network device of claim 1, wherein the data stored in the sorted descriptor ring memory is audio data.

3. The automobile network device of claim 1, wherein the data stored in the sorted descriptor ring memory includes video data.

4. The automobile network device of claim 1, wherein the data stored in the sorted descriptor ring memory is time sensitive networking data.

5. An automobile network device, comprising:
a descriptor sorting engine (DSE), the DSE engine comprising:
   a memory organized by channel clusters that each include first-in first-out (FIFO) memories;
   a time stamp (TS) sorting logic component; and a direct memory access (DMA) controller coupled to the memory and the TS sorting logic component, wherein the DMA controller is configured to:
  pull timestamp-pointer pairs from packet descriptors stored in an unsorted descriptor ring memory;
  trigger the TS sorting logic component to reorder the timestamp-pointer pairs in the FIFO memories so that the timestamp-pointer pairs are sorted in ascending order; and
  store the packet descriptors in a sorted descriptor ring memory;
an Ethernet media access controller (EMAC) coupled to the DMA controller, wherein the DMA controller is further configured to:
  store the timestamp-pointer pairs in the FIFO memories prior to triggering the TS sorting logic component to reorder the timestamp-pointer pairs in the FIFO memories so that the timestamp-pointer pairs are sorted in ascending order;
  use the sorted timestamp-pointer pairs in the FIFO memories to read the packet descriptors stored in an unsorted descriptor ring memory prior to storing the packet descriptors in the sorted descriptor ring memory; and
  trigger the EMAC to stream data from the sorted descriptor ring memory, wherein the EMAC includes a dedicated descriptor ring scanner (DRS) hardware; and
a processor configured to invoke the DRS hardware in response to determining that there is an opportunity to modify the EMAC Internet protocol (EMAC IP).

6. The automobile network device of claim 5, wherein invoking the DRS hardware causes the DRS hardware to:
  fetch a descriptor header pointed by a descriptor ring buffer read index;
  compare a timestamp embedded in the descriptor header with a current time to determine whether the timestamp has elapsed;
  trigger a DMA controller of a current descriptor to transfer packets on a network in response to determining that the timestamp is elapsed; and
  increment the descriptor ring buffer read index.

7. A method performed by one or more processors of an automobile network device, comprising:
  pulling timestamp-pointer pairs from packet descriptors stored in an unsorted descriptor ring memory;
  triggering the TS sorting logic component to reorder the timestamp-pointer pairs in the FIFO memories so that the timestamp-pointer pairs are sorted in ascending order;
  storing the packet descriptors in a sorted descriptor ring memory;
  storing the timestamp-pointer pairs in the FIFO memories;
  using the sorted timestamp-pointer pairs in the FIFO memories to read the packet descriptors stored in an unsorted descriptor ring memory;
  triggering an Ethernet media access controller (EMAC) to stream data from the sorted descriptor ring memory;
  determining that there is no opportunity to modify the EMAC Internet protocol (EMAC IP); and
  invoking sorting of data packets in response to the determining that there is no opportunity to modify the IP.

8. The method of claim 7, wherein the data stored in the sorted descriptor ring memory is audio data.

9. The method of claim 7, wherein the data stored in the sorted descriptor ring memory includes video data.

10. The method of claim 7, wherein the data stored in the sorted descriptor ring memory is time sensitive networking data.

11. A method performed by one or more processors of an automobile network device, comprising;
  pulling timestamp-pointer pairs from packet descriptors stored in an unsorted descriptor ring memory;
  triggering the TS sorting logic component to reorder the timestamp-pointer pairs in the FIFO memories so that the timestamp-pointer pairs are sorted in ascending order;
  storing the packet descriptors in a sorted descriptor ring memory;
  storing the timestamp-pointer pairs in the FIFO memories;
  using the sorted timestamp-pointer pairs in the FIFO memories to read the packet descriptors stored in an unsorted descriptor ring memory;
  triggering an Ethernet media access controller (EMAC) to stream data from the sorted descriptor ring memory;
  determining that there is an opportunity to modify the EMAC Internet protocol (EMAC IP); and
  invoking a dedicated descriptor ring scanner (DRS) hardware in response to the determining that there is an opportunity to modify the IP.

12. The method of claim 11, wherein invoking the DRS hardware comprises:
  fetching a descriptor header pointed by a descriptor ring buffer read index;
  comparing a timestamp embedded in the descriptor header with a current time to determine whether the timestamp has elapsed;
  triggering a direct memory access (DMA) controller of a current descriptor to transfer packets on a network in response to determining that the timestamp is elapsed; and
  incrementing the descriptor ring buffer read index.

13. An automobile network device, comprising:
  a memory organized by channel clusters that each include first-in first-out (FIFO) memories;
  means for pulling timestamp-pointer pairs from packet descriptors stored in an unsorted descriptor ring memory;
  means for triggering the TS sorting logic component to reorder the timestamp-pointer pairs in the FIFO memories so that the timestamp-pointer pairs are sorted in ascending order;
  means for storing the packet descriptors in a sorted descriptor ring memory;
  means for storing the timestamp-pointer pairs in the FIFO memories;
  means for using the sorted timestamp-pointer pairs in the FIFO memories to read the packet descriptors stored in an unsorted descriptor ring memory;
  means for triggering an Ethernet media access controller (EMAC) to stream data from the sorted descriptor ring memory; and
  means for invoking sorting of data packets in response to determining that there is no opportunity to modify the EMAC Internet protocol (EMAC IP).

14. The automobile network device of claim 13, wherein the data stored in the sorted descriptor ring memory is audio data.

15. The automobile network device of claim 13, wherein the data stored in the sorted descriptor ring memory includes video data.

16. The automobile network device of claim 13, wherein the data stored in the sorted descriptor ring memory is time sensitive networking data.

17. An automobile network device, comprising:
a memory organized by channel clusters that each include first-in first-out (FIFO) memories;
means for pulling timestamp-pointer pairs from packet descriptors stored in an unsorted descriptor ring memory;
means for triggering the TS sorting logic component to reorder the timestamp-pointer pairs in the FIFO memories so that the timestamp-pointer pairs are sorted in ascending order;
means for storing the packet descriptors in a sorted descriptor ring memory;
means for storing the timestamp-pointer pairs in the FIFO memories;
means for using the sorted timestamp-pointer pairs in the FIFO memories to read the packet descriptors stored in an unsorted descriptor ring memory;
means for triggering an Ethernet media access controller (EMAC) to stream data from the sorted descriptor ring memory; and
means for invoking a dedicated descriptor ring scanner (DRS) hardware in response to determining that there is an opportunity to modify the EMAC Internet protocol (EMAC IP).

18. The automobile network device of claim 17, wherein means for invoking the DRS hardware comprises:
means for fetching a descriptor header pointed by a descriptor ring buffer read index;
means for comparing a timestamp embedded in the descriptor header with a current time to determine whether the timestamp has elapsed;
means for triggering a direct memory access (DMA) controller of a current descriptor to transfer packets on a network in response to determining that the timestamp is elapsed; and
means for incrementing the descriptor ring buffer read index.

19. A non-transitory processor-readable medium having stored thereon processor-executable instructions configured to cause a processor of an automobile network device to perform operations comprising:
pulling timestamp-pointer pairs from packet descriptors stored in an unsorted descriptor ring memory;
triggering the TS sorting logic component to reorder the timestamp-pointer pairs in the FIFO memories so that the timestamp-pointer pairs are sorted in ascending order;
storing the packet descriptors in a sorted descriptor ring memory;
storing the timestamp-pointer pairs in the FIFO memories;
using the sorted timestamp-pointer pairs in the FIFO memories to read the packet descriptors stored in an unsorted descriptor ring memory;
triggering an Ethernet media access controller (EMAC) to stream data from the sorted descriptor ring memory; and
invoking sorting of data packets in response to determining that there is no opportunity to modify the EMAC Internet protocol (EMAC IP).

20. The non-transitory processor-readable medium of claim 19, wherein the data stored in the sorted descriptor ring memory includes one or more of audio data, video data or time sensitive networking data.

21. A non-transitory processor-readable medium having stored thereon processor-executable instructions configured to cause a processor of an automobile network device to perform operations comprising:
pulling timestamp-pointer pairs from packet descriptors stored in an unsorted descriptor ring memory;
triggering the TS sorting logic component to reorder the timestamp-pointer pairs in the FIFO memories so that the timestamp-pointer pairs are sorted in ascending order;
storing the packet descriptors in a sorted descriptor ring memory;
storing the timestamp-pointer pairs in the FIFO memories;
using the sorted timestamp-pointer pairs in the FIFO memories to read the packet descriptors stored in an unsorted descriptor ring memory;
triggering an Ethernet media access controller (EMAC) to stream data from the sorted descriptor ring memory; and
invoking a dedicated descriptor ring scanner (DRS) hardware in response to determining that there is an opportunity to modify the EMAC Internet protocol (EMAC IP).

22. The non-transitory processor-readable medium of claim 21, wherein the stored processor-executable instructions are configured to cause the processor of the automobile network device to perform operations such that invoking the DRS hardware comprises:
fetching a descriptor header pointed by a descriptor ring buffer read index;
comparing a timestamp embedded in the descriptor header with a current time to determine whether the timestamp has elapsed;
triggering a direct memory access (DMA) controller of a current descriptor to transfer packets on a network in response to determining that the timestamp is elapsed; and
incrementing the descriptor ring buffer read index.

* * * * *